US012652325B2

(12) United States Patent
Inkley et al.

(10) Patent No.: US 12,652,325 B2
(45) Date of Patent: Jun. 9, 2026

(54) SYSTEMS FOR AND METHODS OF COLLABORATIVE DATA SHARING

(71) Applicant: Jambooks, LLC, Centerville, UT (US)

(72) Inventors: Wendy Elmer Inkley, Centerville, UT (US); Daniel Dale Inkley, Centerville, UT (US); Breanne Welch, Kaysville, UT (US); Addison Cole Welch, Kaysville, UT (US); Fred Gary Larsen, Kaysville, UT (US)

(73) Assignee: Jambooks, LLC, Centerville, UT (US)

( * ) Notice: Subject to any disclaimer, the term of this patent is extended or adjusted under 35 U.S.C. 154(b) by 0 days.

(21) Appl. No.: 18/213,558

(22) Filed: Jun. 23, 2023

(65) Prior Publication Data

US 2024/0430314 A1 Dec. 26, 2024

(51) Int. Cl.
*H04L 65/1093* (2022.01)
*H04L 65/403* (2022.01)
*H04L 67/53* (2022.01)

(52) U.S. Cl.
CPC ........ *H04L 65/1093* (2013.01); *H04L 65/403* (2013.01); *H04L 67/53* (2022.05)

(58) Field of Classification Search
CPC .... H04L 65/1093; H04L 65/403; H04L 67/53
See application file for complete search history.

(56) References Cited

U.S. PATENT DOCUMENTS 9,202,205 B2 * 12/2015 Kothari .................... H04L 67/10
9,641,572 B1 5/2017 Yeskel et al.
11,977,721 B1 * 5/2024 Peterson ............... G06F 3/0484
2001/0049637 A1 * 12/2001 Tso ........................ G06Q 30/02
705/26.8
2003/0038881 A1 * 2/2003 Chauvin ................ G06Q 30/06
348/207.1
2004/0010512 A1 * 1/2004 Smith .................... G06Q 10/10
2007/0250370 A1 * 10/2007 Partridge ............. G06Q 10/109
705/7.14
2009/0055488 A1 * 2/2009 Berry .................... G06Q 50/10
709/206

(Continued)

FOREIGN PATENT DOCUMENTS

KR 20130039828 A 4/2013

OTHER PUBLICATIONS

Chatbooks, https://chatbooks.com/, 2023.

(Continued)

*Primary Examiner* — Jerry B Dennison
(74) *Attorney, Agent, or Firm* — Foley & Lardner LLP

(57) ABSTRACT

A system comprising one or more memory devices and one or more processors. The one or more processors to receive a request to create a group, the request including a user defined parameter and a list, the list including an individual to be invited to the group. The one or more processors to generate the group. The one or more processors to update the group by associating the individual with the group. The one or more processors to generate a plurality of prompts. The one or more processors to provide the plurality of prompts, and receive, from a user device a response including information that pertains to at least one prompt of the plurality of prompts. The one or more processors can generate a deliverable compilation or other copy of the responses.

19 Claims, 19 Drawing Sheets

(56) References Cited

U.S. PATENT DOCUMENTS

| | | | | |
|---|---|---|---|---|
| 2009/0055513 | A1* | 2/2009 | Berry | G06Q 10/02 |
| | | | | 709/219 |
| 2009/0132665 | A1* | 5/2009 | Thomsen | H04L 67/34 |
| | | | | 709/206 |
| 2012/0265758 | A1 | 10/2012 | Han et al. | |
| 2013/0036179 | A1* | 2/2013 | Ferrell | G06Q 10/10 |
| | | | | 709/206 |
| 2013/0332856 | A1* | 12/2013 | Sanders | G06F 3/0488 |
| | | | | 715/753 |
| 2014/0012925 | A1* | 1/2014 | Narayanan | G06F 3/04842 |
| | | | | 709/206 |
| 2014/0372910 | A1 | 12/2014 | Mandzic et al. | |
| 2015/0039616 | A1* | 2/2015 | Rolston | G06F 16/5866 |
| | | | | 707/737 |
| 2016/0149843 | A1* | 5/2016 | Spicer | G06Q 10/101 |
| | | | | 709/206 |
| 2017/0054858 | A1 | 2/2017 | Coelho et al. | |
| 2017/0093780 | A1* | 3/2017 | Lieb | G06F 16/587 |
| 2021/0126967 | A1* | 4/2021 | Green | G06Q 50/01 |
| 2021/0192817 | A1 | 6/2021 | Mcdonald | |
| 2023/0029402 | A1* | 1/2023 | Henkens | H04L 12/1822 |
| 2023/0177621 | A1* | 6/2023 | Xiao | G06Q 30/0201 |
| | | | | 705/7.29 |
| 2023/0412861 | A1* | 12/2023 | Singh | H04N 21/251 |
| 2024/0177198 | A1* | 5/2024 | Gupta | G06Q 30/0201 |
| 2024/0185212 | A1* | 6/2024 | Skipper | G06Q 20/326 |
| 2024/0257274 | A1* | 8/2024 | Diao | G06Q 50/40 |
| 2024/0348514 | A1* | 10/2024 | Yang | H04W 8/00 |

OTHER PUBLICATIONS

Fitzpatrick, "How to Create and Share Collaborative Albums in Google Photos", https://www.howtogeek.com/302063/how-to-create-and-share-collaborative-albums-in-google-photos/.

Greenfly, "The Best Way to Collect Photos From Groups: Pros and Cons of 13 Solutions", https://www.greenfly.com/other-resources/collect-photos-from-group/.

MixBook, "Create Collaborative Photo Books and Photo Albums", https://www.mixbook.com/l/collaboration.

Qeepsake, Inc., https://www.qeepsake.com/.

Romain Dillet, "Meet Crossroad, A Nifty Little App to Create Collaborative Photo Albums", https://techcrunch.com/2015/07/01/meet-crossroad-a-nifty-little-app-to-create-collaborative-photo-albums/.

Storyworth, https://welcome.storyworth.com/, 2012-2023 Storyworth, Inc.

* cited by examiner

100

200

700

PROMPTS

"But what do I SAY?" No worries--we'll help you. We'll text you questions to prompt you, we just need to know how often you'd like to hear from us!

FREQUENCY

705

1X A DAY!

TIME OF DAY?

710

MORNING

715

EVENING

JAM TIME ZONE?

720

MOUNTAIN

725

GO!

800

900

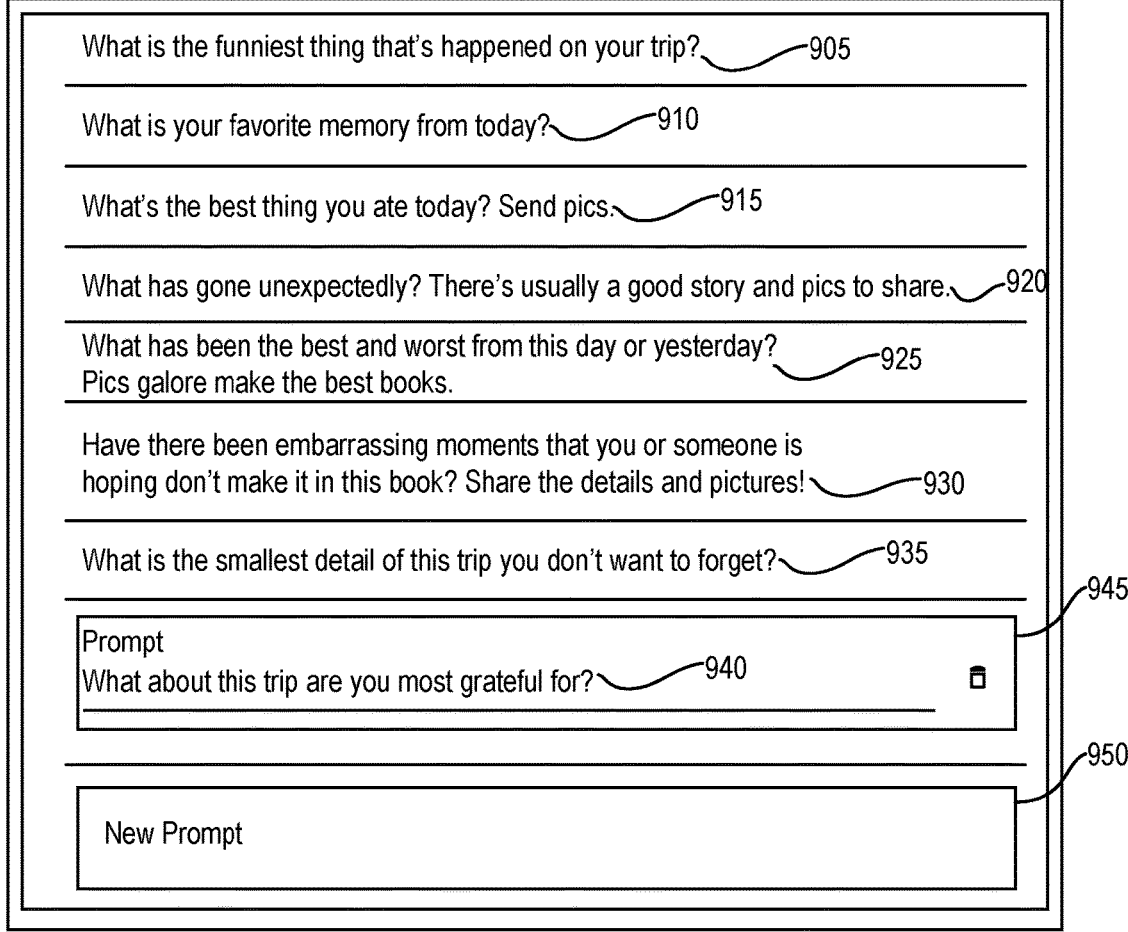

What is the funniest thing that's happened on your trip? 905

What is your favorite memory from today? 910

What's the best thing you ate today? Send pics. 915

What has gone unexpectedly? There's usually a good story and pics to share. 920

What has been the best and worst from this day or yesterday? 925
Pics galore make the best books.

Have there been embarrassing moments that you or someone is
hoping don't make it in this book? Share the details and pictures! 930

What is the smallest detail of this trip you don't want to forget? 935

945

Prompt
What about this trip are you most grateful for? 940

950

New Prompt

SYSTEMS FOR AND METHODS OF COLLABORATIVE DATA SHARING

TECHNICAL FIELD

The present disclosure is directed to mobile devices receiving and sending messages in coordination with one or more other devices, and more particularly to systems and methods for collaborative data (e.g., text, image, audio, video) sharing among mobile devices.

SUMMARY

At least one embodiment relates to a system. The system can include one or more memory devices. The memory devices can store instructions. The instructions can cause one or more processors to receive, from a first user device associated with a first individual, a request to create a group, the request including a user defined parameter and a list, the list including a second individual to be invited to the group. The instructions can also cause the one or more processors to generate, responsive to receiving the request, the group by associating the first individual with the group, and providing, to a second user device associated with the second individual, an invitation to join the group. The invitation to join the group can be provided in a first format. The instructions can also cause the one or more processors to update, responsive to receiving an indication that the second individual accepted the invitation, the group by associating the second individual with the group. The instructions can also cause the one or more processors to generate, using the user defined parameter, a plurality of prompts to be used to request information from the first individual and the second individual. The instructions can also cause the one or more processors to provide, to the first user device, the plurality of prompts. The instructions can also cause the one or more processors to provide, to the second user device, the plurality of prompts, the plurality of prompts can be provided in the first format, and receive, from the second user device, a response including information that pertains to at least one prompt of the plurality of prompts. The response can be provided in the first format and the response is included in a record of responses pertaining to the group. The response can include data, such as text, image, audio, video.

In some embodiments, the instructions can also cause the one or more processors to receive, from the second user device, a plurality of responses including information that pertains to the plurality of prompts. The instructions can also cause the one or more processors to store, in a database, the plurality of responses. The instructions can also cause the one or more processors to provide, to the first user device responsive to a predetermined amount of time, the plurality of responses, and receive, from the first user device, a selection of at least one response of the plurality of responses.

In some embodiments, the instructions can also cause the one or more processors to provide, to at least one of the first user device or the second user device, a first message to propose a deliverable copy (e.g., a physical copy, a compilation) of the at least one response of the plurality of responses. The instructions can also cause the one or more processors to generate, responsive to receiving a response to the first message, the deliverable copy of the at least one response of the plurality of responses, and provide, responsive to generating the deliverable copy of the at least one response of the plurality of responses, a second message to indicate generation of the deliverable copy.

In some embodiments, the instructions can also cause the one or more processors to provide, to the first user device responsive to receiving the response including information that pertains to the plurality of prompts, a message including the response. The instructions can also cause the one or more processors to receive, from the first user device, an indication to generate a deliverable copy of the response, and generate, responsive to receiving the indication, the deliverable copy of the response.

In some embodiments, generating the plurality of prompts can include retrieving, from a database, a plurality of previous prompts established by a third individual, the plurality of previous prompts having a second user defined parameter, the second user defined parameter substantially similar to the user defined parameter, and selecting, from the plurality of previous prompts using one or more rules, a subset of previous prompts of the plurality of previous prompts.

In some embodiments, generating the plurality of prompts can include determining, using information associated with at least one of the first individual or the second individual, a group category. Generating the plurality of prompts can also include identifying, using the group category, a plurality of predetermined prompts, and selecting, from the plurality of predetermined prompts, one or more prompts associated with the user defined parameter.

In some embodiments, the second individual can be one of a plurality of second individuals. The second user device can be one of a plurality of second user devices associated with the plurality of second individuals. The instructions can also cause the one or more processors to provide, to the plurality of second user devices, the plurality of prompts. The instructions can also cause the one or more processors to determine, responsive to a predetermined amount of time, that at least one given individual of the plurality of second individuals has yet to respond to the plurality of prompts, and provide, to a given second user device of the plurality of second user devices associated with the at least one given individual of the plurality of second individuals, a reminder to respond to the plurality of prompts. The reminder can be provided in the first format.

In some embodiments, the instructions can also cause the one or more processors to associate the plurality of prompts with one or more second user defined parameters based on a plurality of relationships between the plurality of prompts and the one or more second user defined parameters. The instructions can also cause the one or more processors to receive, from a third individual, a request to generate prompts for a second group, the request including a third user defined parameter, and generate, responsive to determining an association between the third user defined parameter and the one or more second user defined parameters, a second plurality of prompts for the second group. The second plurality of prompts can include at least one prompt of the plurality of prompts.

In some embodiments, the instructions can also cause the one or more processors to receive, from the first user device, a revision to a given prompt of the plurality of prompts. The instructions can also cause the one or more processors to update, responsive to receipt of the revision, the given prompt of the plurality of prompts to reflect the revision. The instructions can also cause the one or more processors to determine that the information included in the response received from the second user device pertains to a second given prompt of the plurality of prompts, and provide, to the second user device, the given prompt of the plurality of prompts.

In some embodiments, the response including information that pertains to the at least one prompt plurality of prompts can include at least one of a video, an image, a message, an annotation, or a recording.

In some embodiments, the user defined parameter can be at least one of an event type, a geographic location, a point of interest, a person, a memory, or an entity.

In some embodiments, the first format can be at least one of multimedia messaging service (MMS), or short messaging service (SMS).

In some embodiments, at least one of the invitation to join the group or the plurality of prompts can be provided, to the second user device, without the second individual having a user account.

In some embodiments, the response including information that pertains to the at least one prompt of the plurality of prompts can be received, from the second user device, without the second individual having the user account.

At least one embodiment relates to a method. The method can include receiving, by one or more processors from a first user device associated with a first individual, a request to create a group, the request including a user defined parameter and a list, the list including a second individual to be invited to the group. The method can also include generating, by the one or more processors responsive to receiving the request, the group by associating the first individual with the group, and providing, to a second user device associated with the second individual, an invitation to join the group. The invitation to join the group can be provided in a first format. The method can also include updating, by the one or more processors responsive to receiving an indication that the second individual accepted the invitation, the group by associating the second individual with the group. The method can also include generating, by the one or more processors using the user defined parameter, a plurality of prompts to be used to request information from the first individual and the second individual. The method can also include providing, by the one or more processors to the first user device, the plurality of prompts. The method can also include providing, by the one or more processors to the second user device, the plurality of prompts, the plurality of prompts can be provided in the first format, and receiving, by the one or more processors from the second user device, a response including information that pertains to at least one prompt of the plurality of prompts. The response can be provided in the first format and the response is included in a record of responses pertaining to the group.

In some embodiments, the method can also include receiving, by the one or more processors from the second user device, a plurality of responses including information that pertains to the plurality of prompts. The method can also include storing, by the one or more processors in a database, the plurality of responses. The method can also include providing, by the one or more processors to the first user device responsive to a predetermined amount of time, the plurality of responses, and receiving, by the one or more processors from the first user device, a selection of at least one response of the plurality of responses.

In some embodiments, the method can also include providing, by the one or more processors to at least one of the first user device or the second user device, a first message to propose a physical copy of the at least one response of the plurality of responses. The method can also include generating, by the one or more processors responsive to receiving a response to the first message, the physical copy of the at least one response of the plurality of responses, and providing, by the one or more processors responsive to generating the physical copy of the at least one response of the plurality of responses, a second message to indicate generation of the physical copy.

At least one embodiment relates to one or more non-transitory computer-readable storage media. The one or more non-transitory computer-readable storage media can have instructions that cause one or more processors to receive, from a first user device associated with a first individual, a request to create a group, the request including a user defined parameter and a list, the list including a second individual to be invited to the group. The instructions can also cause the one or more processors to generate, responsive to receiving the request, the group by associating the first individual with the group, and providing, to a second user device associated with the second individual, an invitation to join the group. The invitation to join the group can be provided in a first format. The instructions can also cause the one or more processors to update, responsive to receiving an indication that the second individual accepted the invitation, the group by associating the second individual with the group. The instructions can also cause the one or more processors to generate, using the user defined parameter, a plurality of prompts to be used to request information from the first individual and the second individual. The instructions can also cause the one or more processors to provide, to the first user device, the plurality of prompts. The instructions can also cause the one or more processors to provide, to the second user device, the plurality of prompts, the plurality of prompts can be provided in the first format, and receive, from the second user device, a response including information that pertains to at least one prompt of the plurality of prompts. The response can be provided in the first format and the response is included in a record of responses pertaining to the group.

In some embodiments, the instructions can also cause the one or more processors to receive, from the first user device, a revision to a given prompt of the plurality of prompts. The instructions can also cause the one or more processors to update, responsive to receipt of the revision, the given prompt of the plurality of prompts to reflect the revision. The instructions can also cause the one or more processors to determine that the information included in the response received from the second user device pertains to a second given prompt of the plurality of prompts, and provide, to the second user device, the given prompt of the plurality of prompts.

In some embodiments, at least one of the invitation to join the group or the plurality of prompts can be provided, to the second user device, without the second individual having a user account, and the response including information that pertains to the at least one prompt of the plurality of prompts can be received, from the second user device, without the second individual having the user account.

BRIEF DESCRIPTION OF THE DRAWINGS

FIG. 9 is a user interface of a system for collaborative messaging, according to some embodiments.

Figure 1:
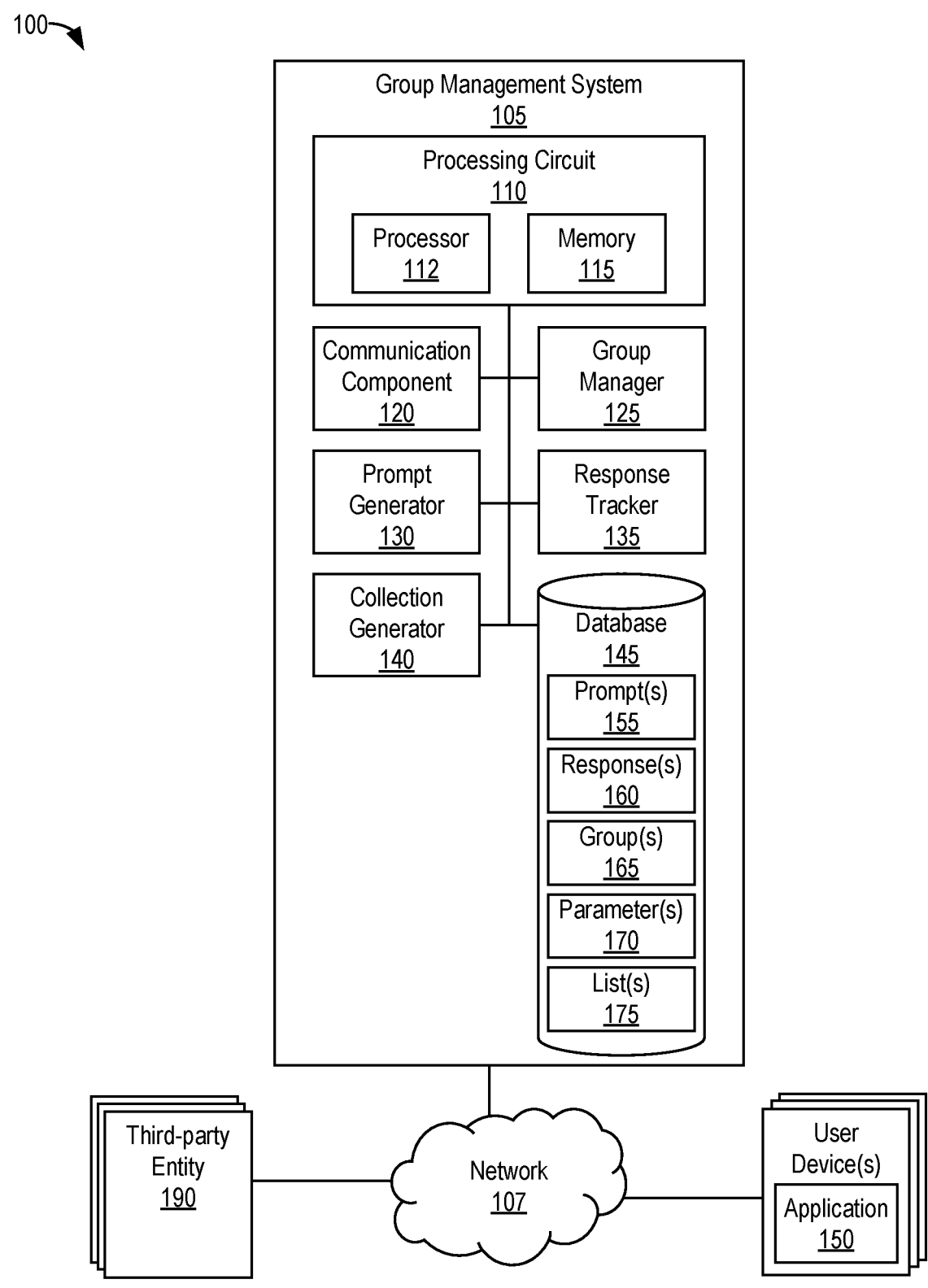
FIG. 1 is a block diagram of a system for collaborative messaging, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The systems and methods described herein relate to collaborative messaging and interacting between devices for a group to provide responses to generated prompts and for collecting the responses. The systems and methods described herein address issues with receiving responses from user devices associated with individuals that may not have user accounts for various computer applications, service providers, networking services, communication platforms, web service applications, social media platforms, and/or among other possible applications and/or platforms. In particular, the systems and methods relate to providing prompts in a given format resulting in individuals being able to respond to the prompts without having a user account associated with a service provider of the prompts. A computer configured to implement the systems and/or methods described herein may generate prompts, provide the prompts to a user device, and receive responses to the prompts. The prompts may be provided in a first format and the responses to the prompts may also be provided in the first format. For example, a prompt may be provided to a user device as a multimedia messaging (MMS) message and the response may be provided to the computer as an MMS message. The computer can store, keep, maintain, and/or otherwise record the response for use in creating physical, tangible, consumable, or otherwise deliverable copies of the responses.

In one example, a first individual having a first user device may interact with and/or otherwise interface with the computer to establish and/or otherwise create a group. The group can include one or more individuals. For example, the group can include the first individual and a second individual. In this example, the first individual may have a user account with the service provided associated with the computer. The first individual can establish parameters of the group and the parameters of the group may be used by the computer to generate prompts. The generated prompts may be provided to a user device of the second individual. The second individual may use the user device to respond to the generated prompts and the response may be stored by the computer. The computer may provide the responses to a user device associated with the first individual. The first individual may select one or more responses for distribution to individuals of the group.

In many instances, individuals may be required to have a user account to interact with and/or otherwise interface with applications and/or platforms provided by various service providers. The requirement for individuals to have user accounts to interact with various aspects of the service providers may result in the individuals attempting to respond to prompts only to find out that they must first create an account before being able to respond. This may result in the individual failing to respond and/or providing a delay response. For example, the individual may be unable to figure out how to create an account and as a result the individual may be unable to respond.

A computer implementing the systems and methods described herein may overcome the aforementioned technical deficiencies by providing individuals with the ability to receive and/or respond to prompts without first having to create a user account. For example, the computer can provide a short messaging service (SMS) message to a user device of an individual and the computer may be able to receive a response and store the response without having the individual first create a user account.

As used herein, a "prompt" may refer to and/or include at least one of a message, an image, a text box, a collection of words, a request for a response, an emoji or other image, and/or other possible combinations. As used herein, a "response" may refer to and/or include information that is provided by an individual, via a user device, in response to receiving a prompt. The information may include at least one of words, letters, emojis, photos, videos, images, captions, annotations, pictures, recordings, audio files, and/or other possible combinations.

FIG. 1 is a block diagram of a system 100 for collaborative messaging, according to some embodiments. The system 100 and/or a component thereof may be implemented by the computer described herein to provide some of the technical solutions described herein. Each system and/or component of the system 100 can include one or more processors, memory, network interfaces, communication interfaces, and/or user interfaces. Memory can store programming logic that, when executed by the processor, implements, controls or otherwise directs the operation of the corresponding computing system or device. Memory can also store data in databases. The network interfaces can allow the systems and/or components of the system 100 to communicate wirelessly. The communication interfaces can include wired and/or wireless communication interfaces and the systems and/or components of the system 100 can be connected via the communication interfaces. The various components in the system 100 can be implemented via hardware (e.g., circuitry), software (e.g., executable code), or any combination thereof. Systems, devices, and components in FIG. 1 can be added, deleted, integrated, separated, and/or rearranged.

The system 100 can include at least one group management system 105, at least one network 107, and one or more user devices 109. The network 107 can be and/or include a local area network (LAN), wide area network (WAN), telephone network (such as the Public Switched Telephone Network (PSTN)), Controller Area Network (CAN), wireless link, intranet, the Internet, a cellular network and/or combinations thereof. The network 107 may allow for the group management system 105 and the user device(s) 109 to interact with and/or otherwise interface with one another. The user device(s) 109 can be and/or include at least one of a mobile computing device, a desktop computer, a smartphone, a tablet, a smart watch, a smart sensor and/or any other device that can facilitate providing, receiving, displaying and/or otherwise interacting with content (e.g., images, video, audio, text, etc.). In one embodiment, the user device(s) 109 communicate via short messaging service (SMS) texts, multimedia messaging service (MMS) texts, or a similar service, protocol, or communication medium.

The user devices 109 can include at least one application 150 (e.g., a mobile app), in some embodiments. The application 150 may be provided by a service provider associated with the group management system 105. In some embodiments, the group management system 105 may be integrated into the application 150 to allow the user devices 109 to perform similar functions to that of the group management system 105. In some embodiments, the user devices 109 may be able to interact with and/or otherwise interface with the group management system 105 prior to installation of the application 150 on the user devices 109. For example, the user devices 109 can receive prompts from the group management system 105 and the user devices 109 can facilitate user response to the prompts without first having to install the application 150.

The group management system 105 can include at least one processing circuit 110, at least one communication component 120, at least one group manager 125, at least one prompt generator 130, at least one response tracker 135, at least one collection generator 140, and at least one database 145. The group management system 105 can be distributed across one or more servers, one or more cloud computing devices, and/or among other possible remote devices and/or data centers.

The processing circuit 110 can include at least one processor 112 and memory 115. Memory 115 can be one or more devices (e.g., RAM, ROM, Flash memory, hard disk storage) for storing data. Memory 115 can also store computer code and/or instructions for executing, completing and/or facilitating the various processes described herein. For example, memory 115 may store instructions and the instructions may cause the processors 112 to perform functionality similar to that of the group management system 105 and/or a component thereof. Memory 115 can be or include non-transient volatile memory, non-volatile memory, and non-transitory computer storage media. Memory 115 can include database components, object code components, script components, or any other type of information structure for supporting the various activities and information structures described herein. Memory 116 can be communicably coupled with the processors 112. Memory 115 can also be electrically coupled with the processors 112. The processors 112 can be implemented as one or more application specific integrated circuits (ASICs), one or more field programmable gate arrays (FPGAs), a group of processing components, and/or other suitable electronic processing components.

The communication component 120 can be and/or include network communication devices, network interfaces, and/or other possible communication interfaces. The communication component 120 can be and/or include wired or wireless communications interfaces (e.g., jacks, antennas, transmitters, receivers, transceivers, wire terminals, etc.) for conducting data communications between the group management system 105 and the user devices 109. The communication component 120 can be direct (e.g., local wired or wireless communications) and/or via a communications network (e.g., the network 107). For example, the communication component 120 can include an Ethernet card and port for sending and receiving data via an Ethernet-based communications link or network. The communication component 120 can also include a Wi-Fi transceiver for communicating via a wireless communications network (e.g., the network 107). The communication component 120 can include a power line communications interface. The communication component 120 can include an Ethernet interface, a USB interface, a serial communications interface, and/or a parallel communications interface. The communication component 120 can interface with, interact with and/or otherwise communicate with at least one of the group manager 125, the prompt generator 130, the response tracker 135, the collection generator 140, and/or the database 145.

The communication component 120 can receive at least one request. For example, the communication component 120 can receive a request from the user device 109. The request can be a request to create a group 165. For example, an individual associated with the user device 109 may want to track, collect, and/or otherwise maintain information that is gathered by one or more additional individuals associated with an event and/or an occurrence. For example, the individual may want to collect photos that are taken at a wedding. The individual can, via the user device 109, provide the request to create the group 165 to the communication component 120. The request can be provided to the communication component 120 in at least one format. For example, the individual can provide the request to the communication component 120 via an MMS message, an SMS message, and/or by interacting with a user interface that is created, provided, generated, and/or otherwise presented via a display of the user device 109. The request can include at least one user defined parameter 170 and at least one list 175. The communication component 120 can provide, to the group manager 125, the request to create the group 165. The communication component 120 can also provide, to the group manager 125, the list 175 included in the request.

The user defined parameter 170 can include at least one of an event type, a geographic location, a point of interest, a person, a memory, and/or an entity. For example, the user defined parameter 170 included in the request can be that the group 165 pertains to a wedding (e.g., a given event type). The list 175 included in the request can include at least one individual to be invited to the group. For example, the list 175 can include at least one individual that is anticipated to be attending the wedding. The list 175 can also include at least one contact medium for the individuals. For example, the list 175 can include a mobile phone number for the individuals included in the list.

The group manager 125 can receive, from the communication component 120, the request to create the group 165. The group manager 125 can generate, responsive to receiving the request, the group 165. The group manager 125 can generate the group 165 by associating the individual with the group 165 (e.g., the individual that provided the request). For example, the group manager 125 can create a record indicating the individual that is providing the request (e.g., a name, a phone number, and/or among other possible forms of identification information) and the group manager 125 can provide the record to the database 145. The database 145 can keep, store, maintain, and/or otherwise hold the record provided by the group manager 125. The record can be stored by the database 145 as and/or included with the groups 165. The group manager 125 can also generate the group 165 by providing, to a user device associated with at least one individual included in the list, an invitation to join the group. For example, the group manager 125 can generate a message asking the individual to join the group 165 (e.g., the individual accepts a request to receive and/or provide messages). The group manager 125 can provide the message to the communication component 120.

The communication component 120 can provide, to the user device(s) 109, the invitation to join the group 165. The invitation provided by the communication component 120 can include at least one format. For example, the invitation can be provided to the user device 109 as an MMS message. The communication component 120 can receive, from the user device 109, a response. For example, the response can be the individual indicating that they accepted the invitation to join to the group. The communication component 120 can provide, to the group manager 125, the indication that the individual accepted the invitation.

The group manager 125 can update, responsive to receiving the indication that the individual accepted the invitation, the group by associating the individual with the group 165. For example, the group manager 125 can retrieve, from the database 145 the record (stored as group 165 in the database) indicating that the individual who provided the request to create the group 165 is associated with the group 165. The group manager 125 can update the record to also indicate the individual asked to join the group 165 has accepted the invitation to join the group 165. The updated record can be provided to the database 145 (e.g., the group 165 is updated to indicate both individuals). The group manager 125 can provide, to the prompt generator 130, an indication that the group 165 has been generated and/or otherwise established. The group manager 125 and/or the communication component 120 can provide, to the prompt generator 130, the user defined parameter 170 included in the request.

The prompt generator 130 can generate at least one prompt 155. For example, the prompt generator 130 can generate prompts 155 to be used to request information from the individuals included in the group 165. The prompts 155 can include a message asking the individuals included in the group 165 to provide a picture from the wedding (e.g., the user defined parameter 170). The prompt generator 130 can generate the prompts 155 using the user defined parameter 170. For example, the database 145 can store, keep, maintain, and/or otherwise hold prompts 155 pertaining to one or more user defined parameters 170 (e.g., prompts 155 for weddings, prompts 155 for birthdays, prompts 155 for vacations, prompts 155 for holidays, prompts 155 for a given location, prompts 155 for a given attraction, etc.).

The prompt generator 130 can retrieve, from the database 145, the prompts 155 pertaining to the user defined parameter 170 included in the request. The prompt generator 130 can then generate the prompts 155 for the group 165 by adding, inserting, and/or otherwise inputting information associated with the user defined parameter 170 and/or the individuals into the prompts 155. For example, a prompt 155 retrieved from the database 145 may be "what was the best part about the _ Wedding" and the prompt generator 130 can insert into the prompt 155 the last name of the wedding party. For example, the prompt 155 may then read "what was the best part about the Smith/Jones wedding?" The prompt generator 130 can provide, to the communication component 120, the generated prompts 155.

The prompt generator 130 can be and/or include Artificial Intelligence (AI) and/or Machine Learning (ML) models. For example, the prompt generator 130 can be a generative AI model and the prompt generator 130 can be trained to detect correlations between different groups 165. For example, the prompt generator 130 can be trained to detect given prompts 155 that may result in a larger number of responses (e.g., a first prompt 155 and a second prompt 155 were both provided to 10 individuals however the first prompt 155 resulted in responses from 9 out of the 10 individuals and the second prompt 155 resulted in responses from 3 out of the 10 individuals). The prompt generator 130 may determine to provide the first prompt 155 to one or more subsequent groups 165 having a similar user defined parameter 170 to that of the first prompt 155 and the second prompt 155.

The communication component 120 can provide the generated prompts 155. For example, the communication component 120 can provide, to the user device associated with the individual who provided the request, the generated prompts 155. The communication component 120 can also provide the prompts 155 to the user devices associate with the individuals that accepted the request to join the group. The prompts 155 can be provided to the user devices in at least one format. For example, the prompts 155 can be provided to the user devices 109 as one or more MMS messages (a given format). The prompts 155 can be provided to one or more user devices 109.

The communication component 120 can provide the invitation to join one or more groups 165 and/or provide the generated prompts 155 to at least one user device 109 without an individual associated with the user devices 109 having a user account. For example, a user device 109 associated with a request to create a group 165 may have a user account to interact with the group management system 105 via the application 150. However, the communication component 120 can communicate (e.g., provide prompts and/or receive responses) with user devices 109 associated with individuals that may not have a user account associated with a service provider of the group management system 105.

The communication component 120 can receive at least one response 160. For example, the communication component 120 can receive, from the user devices 109, responses 160 to the prompts 155 that were provided to the user devices 109. The responses 160 can include information that pertains to at least one prompt 155 that was provided to the user devices 109. For example, a prompt 155 can ask the individual to provide a photo from a family reunion (e.g., a user defined parameter 170) and the response 160 to the prompt 155 can include at least one photo (e.g., the information that pertains to the prompt 155). The responses 160 can be and/or include at least one of a video, a picture, a message, an annotation, or a recording. For example, a first response 160 can include a photo and a text response (e.g., the message) and a second response 160 can include a video and an annotation (e.g., a marking indicating that the video is of two certain people dancing at the wedding).

The responses 160 can also include information that pertains to multiple prompts 155. For example, a first prompt 155 may ask for a photo and a second prompt 155 may ask for a personalized message. The communication component 120 can receive at least one response 160 pertaining to the first prompt 155 and the second prompt 155. For example, the responses 160 can include a photo and a personalize message. The communication component 120 can provide the response 160 to the database 1245. The database 145 can keep, maintain, hold, store and/or otherwise retain the responses 160.

As a non-limiting example, the communication component 120 can provide prompts 155 to user devices 109 associated with individuals that do not have a user account. The prompts 155 can be provided as SMS messages (e.g., a first format). The communication component 120 can receive responses 160 from the user devices 109 associated with individuals that do not have a user account. The responses 160 can be provided as SMS messages (e.g., the first format).

The response tracker 135 can determine, responsive to a predetermined amount of time, that at least one individual has yet to respond to the prompts. For example, the response tracker 135 can determine that the prompts 155 were provided to a first user device 109 and a second user device 109 but that the communication component 120 has only received the responses 160 from the first user device 109. The response tracker 135 can determine that an individual associated with the second user device 109 has not responded to the prompts 155. The response tracker 135 can receive messages from the communication component 120 responsive to the communication component 120 receiving the responses 160. The messages can indicate given user devices (e.g., the first user device 109, the second user device 109, etc.) associated with given responses 160. The response tracker 135 can analyze, review, and/or otherwise monitor the messages to determine when given individuals may not have responded to the prompts 155.

The response tracker 135 can provide, responsive to determining that at least one individual has yet to respond to the prompts, an indication of the user device associated with the individual to the communication component 120. The communication component 120 can provide, to the user device associated with the individual, a reminder to respond to the prompts. The reminder can be provided in the same format as the prompts 155. For example, the prompts 155 can be provided as an SMS message and the reminder can also be provided as an SMS message. The reminder can include the prompt 155 that was previously sent to the user device.

The communication component 120 can receive, from a user device 109, a revision to at least one prompt 155. For example, the communication component 120 can receive a revision to the prompts 155 that were provided to the user device 109 associated with the individual who created the group 165. The revision to the prompts 155 can be provided as the responses 160. The revision to the prompts 155 can also be provided, via the application 150, by the individual. For example, the individual can access, for example via the application 150, the prompts generated by the prompt generator 130. The individual can revise (e.g., modify, change, adjust, etc.) the prompts 155 by interacting with a user interface displayed on the user device 109. The revision can also be provided to the communication component 120 as a conversational input. For example, the group management system 105 and/or a component thereof can be and/or include a chatbot and the chatbot can receive the conversational input.

The prompt generator 130 can update the prompt 155 to reflect the revision. For example, the revision may be to adjust the prompt from reciting "message" to recite "words of encouragement." In this example, the prompt generator 130 can adjust the prompt by replacing "message" with "words of encouragement." The prompt generator 130 can provide the revised prompt 155 to at least one of the database 145 and/or the communication component 120.

As a non-limiting example, the prompt provided to the user device 109 can be "what was your favorite moment during the trip?" and the conversational input can be "please update the prompt to replace trip with adventure to the amusement park." The conversational input can be received by the communication component 120 and the communication component 120 can provide the conversational input to the prompt generator 130. The prompt generator 130 can analyze and/or evaluate the conversation input to determine that the individual indicated that the prompt be revised to recite "what was your favorite moment during the adventure to the amusement park." The prompt generator 130 can update the prompt to reflect the revision.

The response tracker 135 monitor the responses 160 to determine given responses 160 that pertain to given prompts 155. For example, the response tracker 135 can determine that a first response 160 pertains to a first prompt 155 and a second prompt 155. To continue this example, the first prompt 155 can be a request to provide a photo and the second prompt 155 can be a request to provide a message. The response tracker 135 can determine that the first response 160 include a photo and a message.

The response tracker 135 can analyze and/or evaluate the prompts 155 and the responses 160 to determine correlations between the prompts 155 and the responses 160 (e.g., which prompts pertain to which responses). For example, a prompt 155 can be "please provide your favorite thing about summer" and a response 160 can be "my favorite thing about summer is going to the pool." In this example, the response tracker 135 can determine that a portion of the response 160 correlates to a portion of the prompt 155 (e.g., they both include "favorite" and "summer").

The response tracker 135 can receive, from the prompt generator 130, an indication that at least one prompt 155 has been updated. The indication can include and/or identify the updated prompts 155. The response tracker 135 can determine that information included in the responses 160 pertain to different prompts 155. For example, the response tracker 135 can determine that a first prompt 155 was updated and that a response 160 pertains to a second prompt 155. The response tracker 135 can communicate, with the communication component 120, a message to indicate that the updated first prompt 155 be sent to a user device 109 associated with the second prompt 155. The communication component 120 can provide, to the user device 109, the updated prompt 155.

The communication component 120 can provide the responses to a user device responsive to a predetermined amount of time. For example, the communication component 120 can provide the responses 160 to the user device 109 associated with the originator of the group 165 (e.g., the individual that provided the request to create the group 165). The responses can be provided to the user device 109 after a predetermined amount of time. For example, when the individual provided the request to create the group 165, they indicated that after a seven days (e.g., the predetermined amount of time) that the responses 160 provided by the individuals added to the group 165 be provided.

The communication component 120 can provide the response 160 to the user device 109. For example, the communication component 120 can provide a message including a link. The link can be or include at least one of a hyperlink to a website, a Uniform Resource Locator (URL) address, a deep link leading to a mobile app (e.g., the application 15), and/or among other possible links or icons that can direct the user device 109 to a certain location to view the responses 160. For example, the individual associated with the user device 109 can interact with, interface with, and/or otherwise select the link and the individual selecting the link may direct the user device 109 to a website to view the responses 160.

The communication component 120 can receive a selection of at least one response. For example, the communication component 120 can receive a selection from the responses 160 provided to the user device 109. For example, the individual associated with the user device 109 can view, via a user interface displayed on the user device 109, the responses 160 and the individual can select the responses 160 by at least one of interacting with, interfacing with, and/or otherwise engaging with the user interface to indicate selection of the responses 160.

The communication component 120 can provide a message to propose a deliverable copy (e.g., a physical copy) of the responses 160. For example, the communication component 120 can provide a message that indicates that copies of the responses 160 can be provided to the user devices 109. The copies of the responses 160 can be provided as at least one of a printout of the responses 160, a data file including the responses 160, a digital repository including the responses 160, an album including the responses 160, and/or among also possible formations and/or combinations. The message to propose the deliverable copy of the responses 160 can provided after at least one of a predetermined amount time, the individual who originated the group 165 views the responses, the prompts 155 have been responded to (e.g., the responses 160 were received), and/or among other possible timeframes and/or combinations.

The communication component 120 can receive a response to the message. For example, the communication component 120 can receive a response indicating that at least one individual requested a deliverable copy of the responses 160. The communication component 120 can provide the response to the collection generator 140.

The collection generator 140 can facilitate generation (e.g., collection, compilation) of a deliverable (e.g., physical, tangible, packaged, etc.) copy of the responses 160. For example, the collection generator 140 can generate, responsive to receiving the response to the message, the layout of and/or deliverable copy of the responses 160 provided by the user devices 109. The collection generator 140 can generate the deliverable copy by at least one of accumulating, assembling, clustering, and/or grouping the responses 160 together and providing the collection of the responses 160 (e.g., a physical copy of the responses) to the individuals of the group 165 that requested the deliverable copy. In one embodiment, the collection generator 140 can prepare a communication or otherwise communicate with a third-party entity 190, such as a print shop, publishing house, photo studio, printer, copy machine, etc. that is capable of transforming electronic data comprising the responses 160 into a physical medium. The deliverable copy can be a poster, print, album, book, compact disc (CD), digital video disc (DVD), and electronic photo album, or any other form of perceivable embodiment of the responses 160.

The collection generator 140 can, responsive to generating the deliverable copy, provide an indication to the communication component 120 that the deliverable copies have been generated. The communication component 120 can provide, responsive to generation of the deliverable copy, a message to indicate generation of the deliverable copy. For example, the communication component 120 can provide a message, to the user devices 109 associated with the individuals that requested the deliverable copy, indicating the generation of the deliverable copy.

The system 100 and the various components and functionalities provided thereby can organize a group of one or more individuals to interact and collaboratively share content, whether by text, audio, images, video, etc., on a common topic in a readily ubiquitous communication modality on their user device(s) 109. The system can provide (via MMS or SMS) prompts 155 to the individuals in the group (via the user device(s) 109) and the individuals can respond by replying to one or more of the prompt 155 with responses 160 to be included in the eventual collection. The reply messages (including photos, audio, video) or responses 160 can be collected and then provided back to the individuals in a useful tangible medium such as a photobook, a CD, DVD, album, etc. Stated otherwise, the system 100 provides group a mode of collaboration, and enables a seamless form of communicating (e.g., texting) as the method of collecting the content. The system 100 need not access photos or message from a 3rd party system (e.g., a social media account). The system does not need any individual to upload the photos or messages on their own, such as via an app or upload portal. The collaborating individuals can simply respond to the prompt(s) 155 with the information that can be included in the eventual compilation of the responses 160. One or more participants in the group (e.g., the organizer, or one of the members) can customize the prompts to thereby guide and even customize the collection of responses to be accumulated. Rather than interface with some clunky website or a separate app, a group can communicate or otherwise interact via a communication channel (e.g., SMS, MMS, email) they are already using, on a topic of mutual interest, and the system 100 accumulates and records the responses to transform them to a format that records and maintains the memories of the responses for later consumption and/or enjoyment.

The system 100 can provide thought provoking guidance (e.g., the context and/or contents including in the prompts 150) to individuals to provide a seamless system for capturing experiences, memories, and/or moments in time that may otherwise be missed. For example, the system 100 can enable a first individual and a second individual of a given group to capture, record, and share their given experiences at a shared event (e.g., a wedding, a graduation party, a birthday party, a family vacation, a company retreat, etc.) by providing prompts and recording the responses provided by the individuals. The system 100 can enable the individuals to share their respective experience with one or more additional individuals by recording and providing the responses to the individuals.

Figure 2:
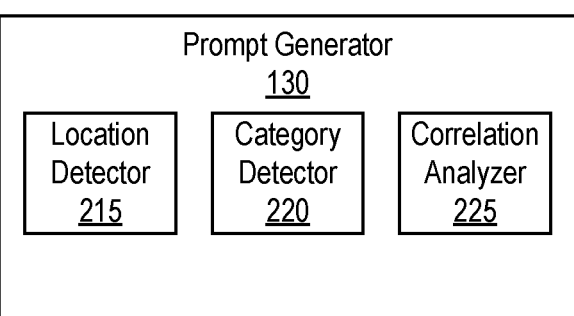
FIG. 2 is a block diagram including one or more components of the system illustrated in FIG. 1, according to some embodiments.

FIG. 2 depicts a block diagram 200 of the prompt generator 130 of FIG. 1. The prompt generator 130 can include at least one location detector 215, at least one category detector 220, and at least one correlation analyzer 225.

As described herein (e.g., above with reference to FIG. 1), the database 145 can keep, maintain, record, and/or otherwise hold the prompts 155 described herein. The prompts 155 can pertain to, correlate to and/or otherwise correspond to one or more groups 165. For example, a first set of prompts 155 can correspond to a first group 165 and a second set of prompts 155 can correspond to a second group 165. The groups 165 can include the same user defined parameter 170. For example, the first group 165 and the second group 165 can both pertain to a wedding (e.g., the same event type). The groups 165 can include different user defined parameters 170. For example, the first group 165 can pertain to a national park (e.g., a given geographic location)

and the second group 165 can pertain to a restaurant (e.g., a point of interest). The prompts 155 can be the generated prompts 155, the prompts 155 updated based on revisions provided by individuals the provided requests to create the groups 165, and/or among other types of prompts described herein.

The correlation analyzer 225 can analyze, evaluate, and/or inspect the prompts 155 to detect and/or determine correlations between the groups 165 and/or the prompts 155. For example, the correlation analyzer 225 can detect correlations between a first set of prompts 155, a first group 165, and a second group 165. To continue this example, the correlations can be that at least one similar prompt was provided to individuals of first group 165 and was also provided to individuals of the second group 165.

The correlation analyzer 225 can detect and/or determine correlations between user defined parameters 170 of the groups 165. For example, the correlation analyzer 225 can determine correlations between weddings (e.g., an event type) for a first group 165 and a second group 165. The correlations between weddings can be that a first given prompt 155 receive a first given number of responses from individuals of the first group 165 and/or the second group 165. The correlation analyzer 225 can provide the correlations between the prompts 155 and/or the groups 165 to the database 145. The correlations can be used during the generation of the prompts 155.

The prompt generator 130 can generate prompts by retrieving, from a database, at least one prompt established by an individual. For example, the prompt generator 130 can retrieve prompts 155, from the database 145, that were revised and/or selected by an individual that provided a request to establish a first group 165. The prompts 155 can have a user defined parameter 170. For example, the user defined parameter 170 can be a family reunion (e.g., a given event type). The prompt generator 130 can generate prompts for a second group 165. The second group 165 can have a similar user defined parameter 170 to that of the first group 165. The correlation analyzer 225 may have provided a correlation to the database 145 to indicate correlations between the similar user defined parameters 170. The prompt generator 130 can also generate the prompts by selecting, from the prompts established by the individual, a subset of the prompts 155 associated with the first group 165.

The category detector 220 can determine and/or detect at least one group category. The group categories can be and/or include information pertaining to the user defined parameters 170. The group categories can provide additional context for the user define parameters 170. For example, the lists 175 can include individuals to be invited to a group 165 and the list 175 can also include descriptions for the individuals (e.g., a relationship between the individuals). To continue this example, the user defined parameter 170 can be a wedding and the description for the individuals can be a role in the wedding (e.g., a member of the wedding party, an usher, a relative, etc.).

The category detector 220 associates one or more group categories with one or more prompts. For example, the category detector 220 can associate a family group category (e.g., the individuals in a first group 165 are family members) with one or more prompts 155. The one or more prompts associated by the category detector 220 with the family group category can be used by the prompt generator 130 to generate the prompts 155 for the first group 165. The category detector 220 can also associate one or more group categories by identifying and/or determining pre-existing associations. For example, the category detector 220 can determine pre-existing associations between given prompts and given group categories.

The category detector 220 can also determine and/or detect associations between groups, individuals, prompts, and/or among various combinations. For example, an association between individuals of a group can be established during the creation of the group. The associations can also be stored and/or maintained in the database 145 and the category detector 220 can determine the associations responsive to accessing and/or retrieving information from the database 145.

The prompt generator 130 can generate the prompts 155 by determining, using information associated with at least one individual, a group category. For example, the prompt generator 130 (e.g., the correlation analyzer 225) can determine that information associated with individuals of a group 165 indicate the individuals are classmates. The prompt generator 130 can identify, using the group category, at least one predetermined prompt. For example, the correlation analyzer 225 can find correlations between prompts and user defined parameters 170 that include a group category of classmates. The correlations can be stored by the database 145 and the prompt generator 130 can retrieve the correlations to identify the predetermined prompts. The prompt generator 130 can also generate the prompts by selecting, from the predetermined prompts, at least one prompt. The prompts selected by the prompt generator 130 can and/or include the generated prompts 155.

The location detector 215 can monitor, track, determine, identify and/or otherwise determine a location of a user device. For example, the location detector 215 can determine a location of the user device(s) 109. The location detector 215 can provide the location to the correlation analyzer 225. The correlation analyzer 225 and/or the prompt generator 130 can use the location of the devices to generate, create, and/or otherwise provide location based prompts. For example, the correlation analyzer 225 can use location information pertaining to previous responses to determine that individuals who travel to a given city enjoy memories associated with a given national park. The prompt generator 130 can use the location information pertaining to previous prompts to generate location based prompts for one or more groups that have traveled to and/or intend to travel to the same given city.

As another example, the location detector 215 can determine that a group is attending a wedding at the same venue as a previous group. The location detector 215 can provide the location of the venue to the correlation analyzer 225. The correlation analyzer 225 can review, analyze, and/or examine the prompts and/or responses associated with the previous group to identify information associated with the venue. For example, the correlation analyzer 225 can determine that the venue, based on the prompts and/or responses, has an iconic chandelier. The prompt generator 130 can, based on the analysis of the correlation analyzer 225, generate prompts specific to the venue of the wedding. For example, the prompt generator 130 can provide a prompt asking for photos of individuals standing near the chandelier.

Figure 3:
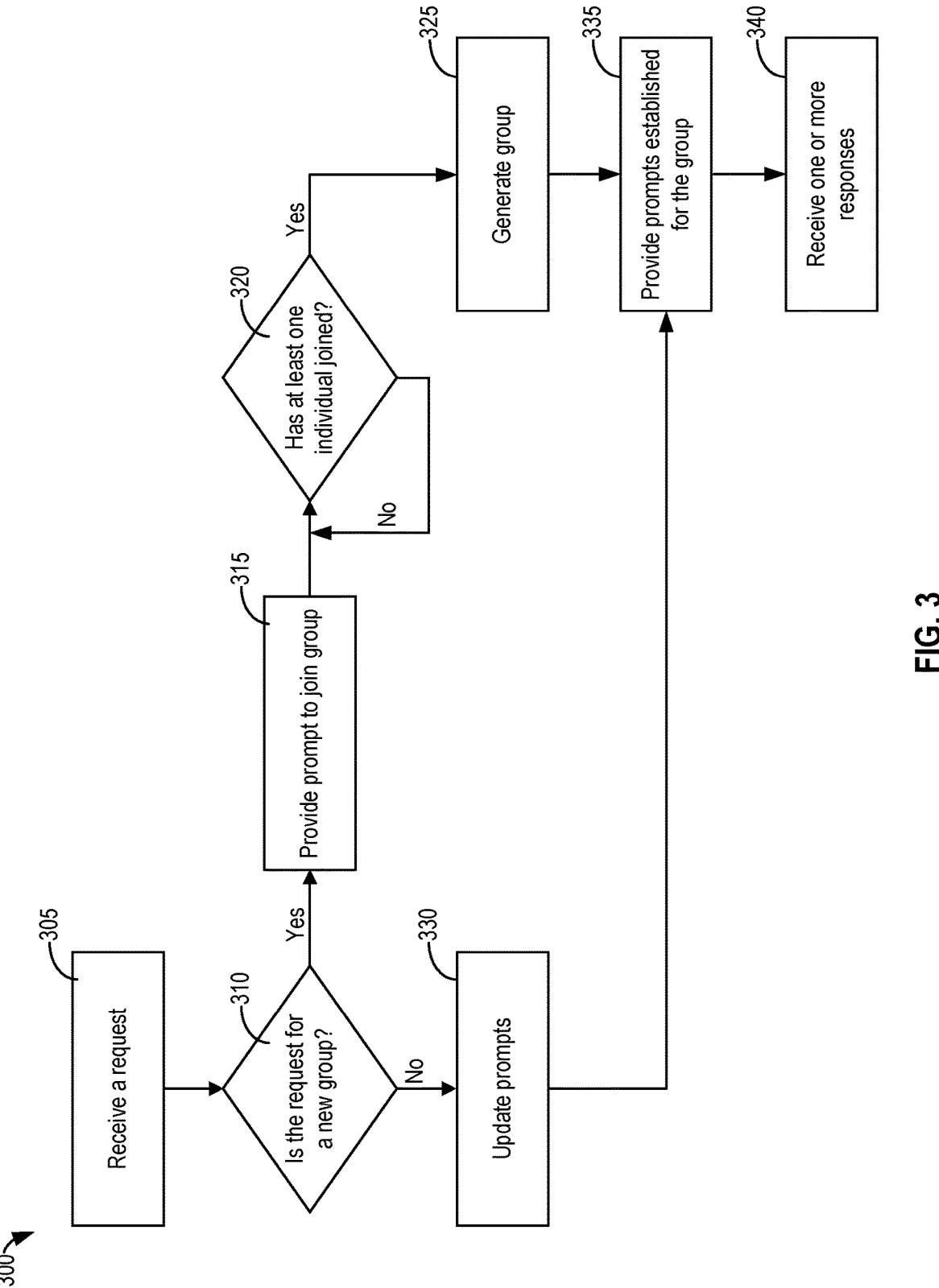
FIG. 3 is a flowchart of a process of creating and tracking groups, according to some embodiments.

FIG. 3 depicts a flow chart of a process 300 of tracking and creating groups. The groups can be and/or include the groups 165. At least one step of the process 300 can be performed by the system 100 and/or a component thereof. For example, the group management system 105 can perform at least one step of the process 300.

At step 305, a request can be received. The request can be a request to create a group 165. The request can include at least one list 175. The request and/or the list 175 can be received by the communication component 120. The list 175 can include at least one user defined parameter 170. The list 175 can include individuals for inclusion in a group 165. The list 175 can also include a contact medium for the individuals included in the group. For example, the list 175 can include phone number for the individuals. The request can also be a request to revise one or more prompts 155 that have been generated for the group 165. For example, the request can include a revision to a prompt 155 and/or the request can include a user defined prompt 155.

At step 310, a determination as to if the request is for a new group can be made. The group manager 125 can determine if the request is for a new group responsive to receiving the request from the communication component 120. For example, the group manager 125 can determine that the request includes the list 175. The group manager 125 can determine that the request is for a new group 165. The group manager 125 can determine that the request is for a revision and/or modification to the group 165 (e.g., a revision to a prompt, a change in the user defined parameter 170, etc.). For example, the group manager 125 can determine that the request includes a revision to a prompt 155. The process 300 can move to step 315 responsive to a determination that the request is for a new group 165. The process 300 can move to step 330 responsive to a determination that the request pertains to something other then a request for a new group.

At step 315, a prompt to join to a group can be provided. For example, the communication component 120 can provide prompts to one or more user devices 109 associated with individuals included in the list 175. The list 175 can be received and/or include with the request that was received in step 305. The prompt can include a message to join the new group 165.

At step 320, a determination as to if at least one individual has joined the group can be made. For example, the response tracker 135 can determine that at least one individual accepted to prompt to join the group 165. The response tracker 135 can also determine that no responses to accept the group 165 have been received. For example, the communication component 120 can provide responses that are received from the user devices 109 to the response tracker 135 and the response tracker 135 can evaluate the responses to determine when individuals have accepted requests and/or prompts to join groups 165. The process 300 can move to step 325 responsive to a determination that at least one individual has joined the group (e.g., accepted to prompt to join). The process 300 can return, move, and/or stay at step 320 while waiting for individuals to accept the request to join the group. The communication component 120 can also provide follow up prompts (e.g., after the response tracker 135 determines at step 320 that no individuals have accepted the request) to the user devices 109.

At step 325, a group can be generated. For example, the group manager 125 can generate a group 165 by adding, including, and/or otherwise associating the individual who provided the request in step 305 and the individuals who accepted the prompts provided at step 315 with the group 165. The generated group 165 can be provided to the database 145. The process can move to step 335 responsive to the generation of the group 165.

At step 330, a prompt can be updated. For example, the prompt generator 130 can receive the request received in step 305 and the prompt generator 130 can determine a given prompt 155 that has been generated for the group 165 to update based on the revision included in the response. The update prompts 155 can be updated to reflect the revision. The process 300 can move to step 335 responsive to updating the prompts.

At step 335, at least one prompt established for the group can be provided. For example, the prompts generated and/or updated by the prompt generator 130 can be provided to the user devices 109 associated with individuals of the group 165. The communication component 120 can provide the prompts 155. The communication component 120 can receive on or more responses 160 that include information pertaining to the prompts 155.

At step 340, at least one response can be received. For example, the response can be a response to a given prompt that was provided in step 335. The response can include information pertaining to the prompt. For example, the response can include a photo and/or a message. The response can be or include at least one response 160. The response 160 can be received by the communication component 120. The communication component 120 can receive the response 160 from a user device 109 associated with an individual of the group.

The communication component 120 can provide the responses, received in step 340, to the collection generator 140 and/or the database 145. The database 145 can store, keep, hold, and/or otherwise maintain the responses 160. The collection generator 140 can facilitate generation of a deliverable copy of the responses 160 received in step 340. The collection generator 140 can also provide an indication responsive to completion of the deliverable copy of the responses 160. The indication can be provided to the communication component 120 and the communication component 120 can provide the indication to one or more user devices 109.

User Interfaces

The group management system 105 and/or component thereof can provide, create, present, and/or otherwise generate at least one user interface. For example, the communication component 120 can provide signals to the user devices 109 that cause the user devices 109 to display at least one user interface. An individual associated with the user devices 109 can interact with, interface with, and/or engage with the user interfaces to create, modify, and/or adjust aspects of the groups 165 (e.g., adjust prompts 155, view responses 160, update user defined parameters 170, etc.).

Figure 4:
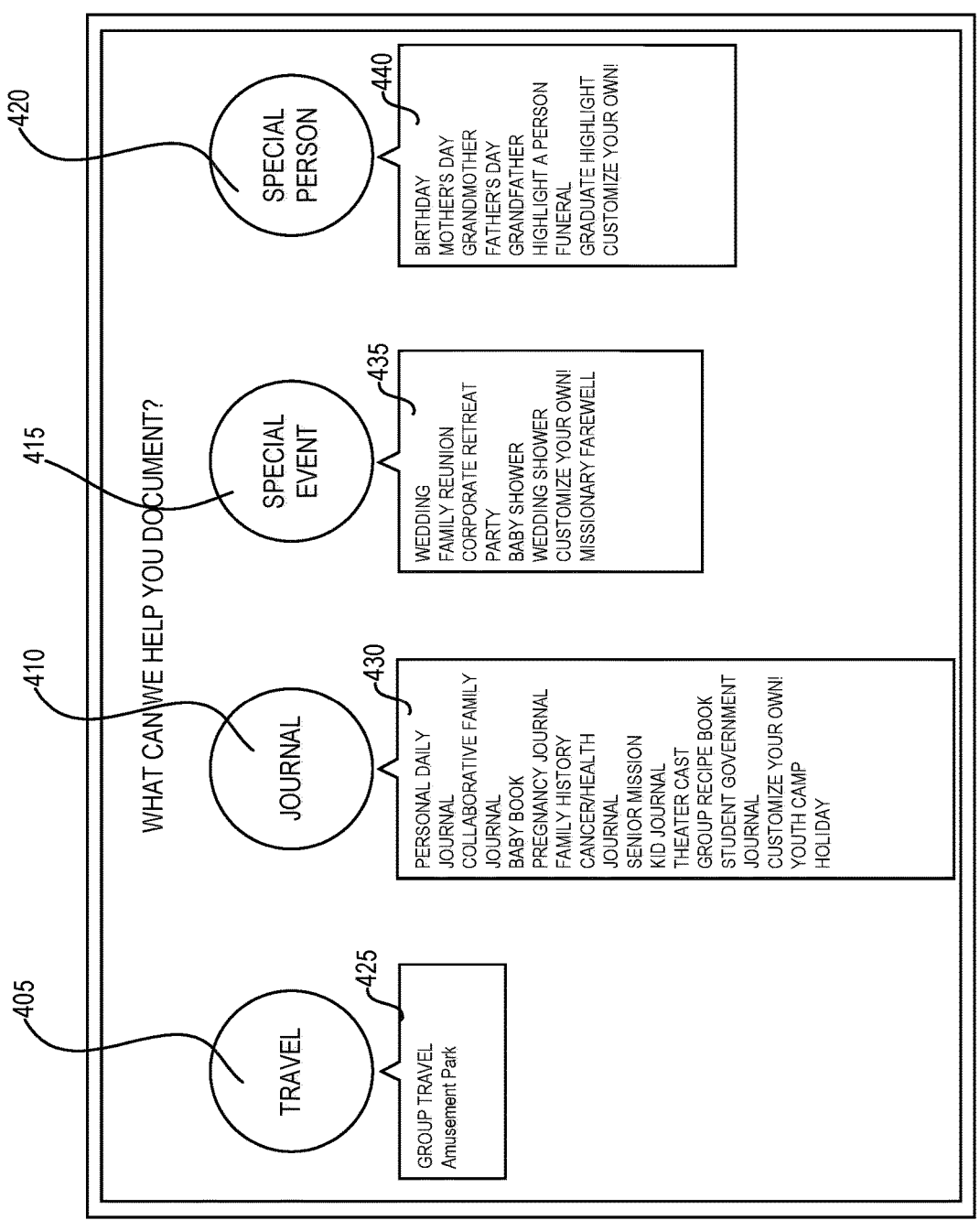
FIG. 4 is a user interface of a system for collaborative messaging, according to some embodiments.

FIG. 4 depicts a user interface 400. The user interface 400 can be generated by the group management system 105. The user interface 400 can be presented, via the user devices 109, to one or more individuals. The user interface 400 can include one or more user defined parameters (e.g., the user defined parameters 170). The user interface 400 includes a travel parameter 405, a journal parameter 410, a special event parameter 415, and a special person parameter 420. The travel parameter 405 can include at least one selectable element 425. The journal parameter 410 is shown can include at least one selectable element 430. The special event parameter 415 can include at least one selectable element 435. The special person parameter 420 can include at least one selectable element 440.

The individual associated with the user device 109 displaying the user interface 400 can interact with, interface with, and/or otherwise engage with one of the selectable elements (e.g., elements 425, 430, 435, and/or 440) to select and/or indicate a user defined parameter. The individual can select one of the elements to initiate and/or continue in the creation of one or more groups 165.

Figure 5:
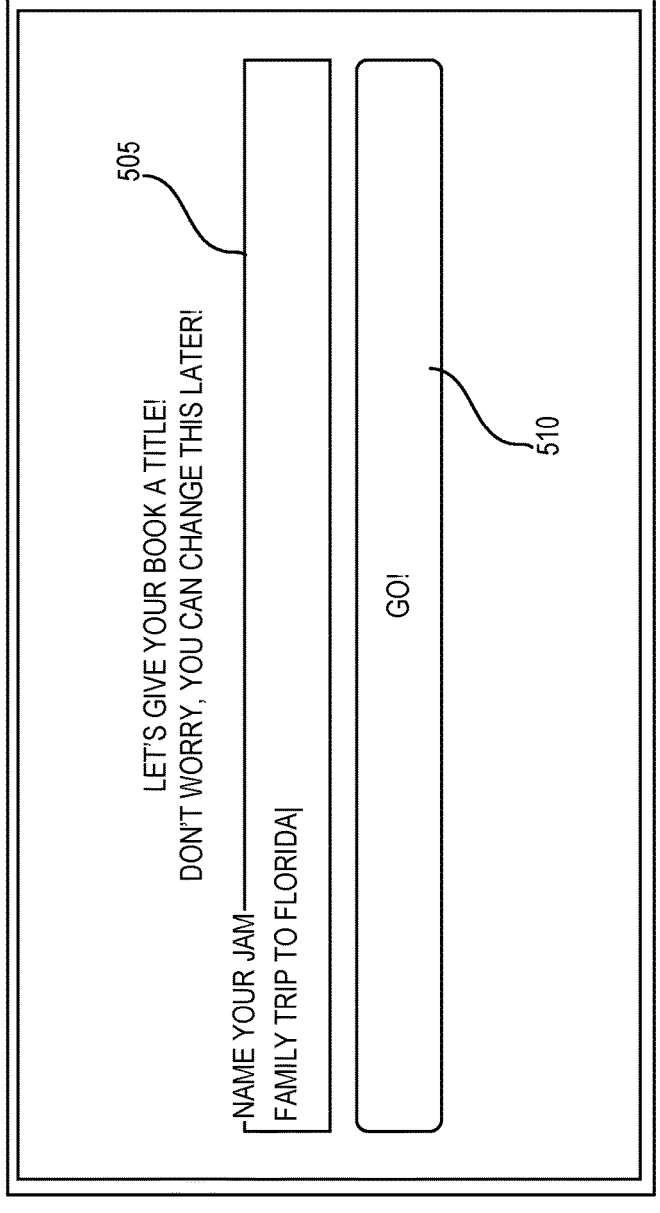
FIG. 5 is a user interface of a system for collaborative messaging, according to some embodiments.

FIG. 5 depicts a user interface 500. The user interface 500 can be generated by the group management system 105. The user interface 500 can be presented, via the user devices 109, to one or more individuals. The user interface 500 can be presented via the user devices 109 responsive to an individual selecting one of the selectable elements shown in FIG. 4. The user interface 500 can include at least one window and/or text box 505. The user interface 500 can include at least one button 510 (shown as a GO button in FIG. 5). FIG. 5 shows that an individual has provided, given, and/or otherwise entered a name for the group 165. The individual can enter the name by interfacing with, interacting with, and/or otherwise engaging with at least a portion of the text box 505.

Figure 6:
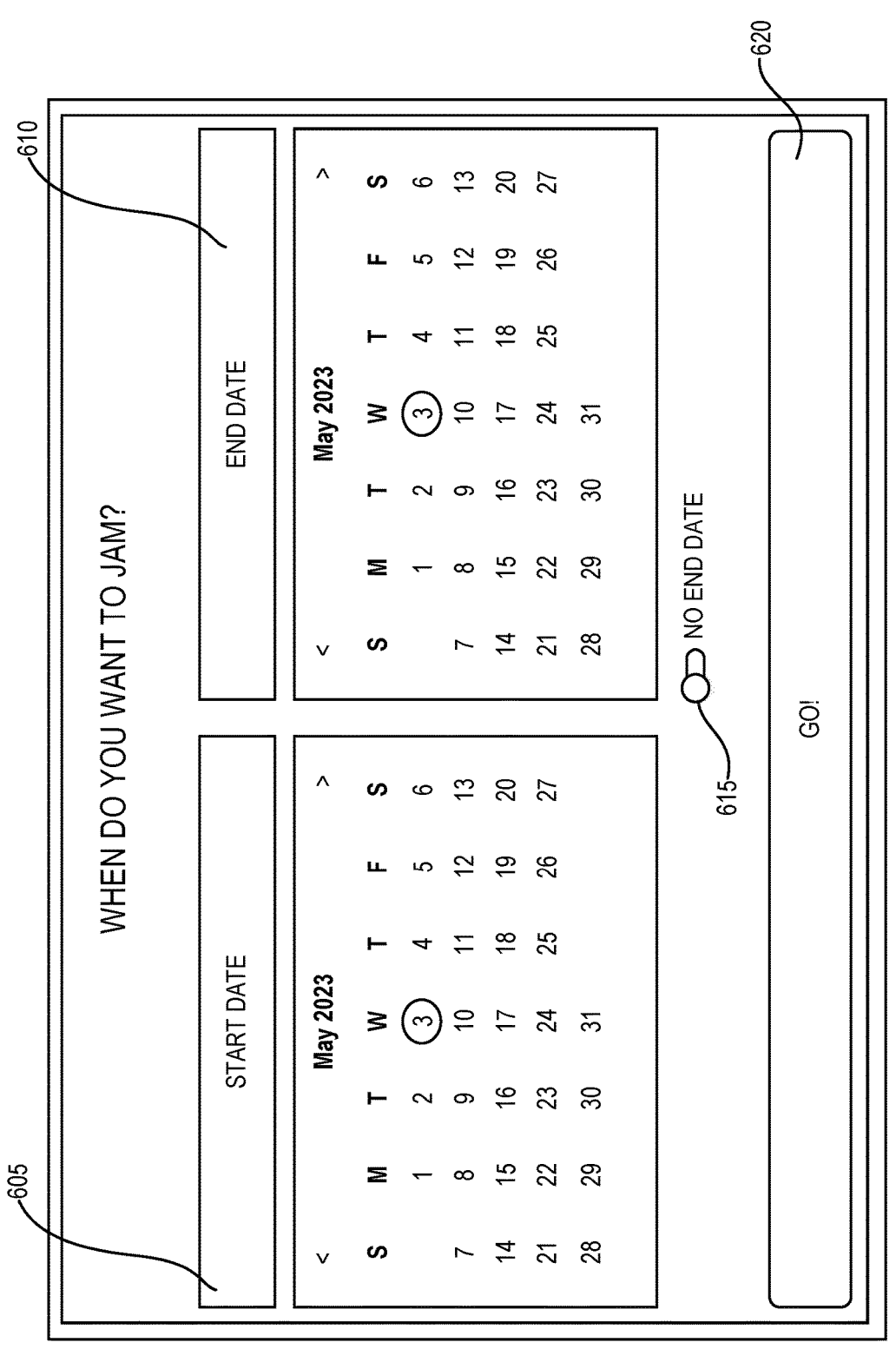
FIG. 6 is a user interface of a system for collaborative messaging, according to some embodiments.

FIG. 6 depicts a user interface 600. The user interface 600 can be generated by the group management system 105. The user interface 600 can be presented, via the user devices 109, to one or more individuals. The user interface 600 can be presented via the user devices 109 responsive to an individual selecting the GO button shown in FIG. 5. The user interface 600 can include at least one start date window 605 and at least one end date window 610. The user interface 600 can include at toggle 615 and at least one button 620. The individual associated with the user devices 109 displaying the user interface 600 can select at least one of the dates within the start date window 605 and/or the end date window 610 to establish a duration for the group 165 (e.g., establish how low the group management system 105 provides prompts 155 and/or monitor responses 160). The individual can select the toggle 615 to switch between no end date and end date. The individual can select the button 620 to establish the end date and/or no end date for the group 165.

Figure 7:
FIG. 7 is a user interface of a system for collaborative messaging, according to some embodiments.

FIG. 7 depicts a user interface 700. The user interface 700 can be generated by the group management system 105. The user interface 700 can be presented, via the user devices 109, to one or more individuals. The user interface 700 can be presented via the user devices 109 responsive to an individual selecting the GO button shown in FIG. 6. The user interface 700 can include at least one selectable element and/or button (e.g., elements 705, 710, 715, 720, and/or 725). The individual associated with the user devices 109 displaying the user interface 700 can interact with, interface with, and/or otherwise engage with the elements to establish one or more aspects of the group. For example, the individual can select the frequency button 705 to a number of prompts 155 to provide to the individuals of the group 165. The individual can establish a time of day for delivery of the prompts by selecting at least one of the morning button 710 and/or the evening button 715. The individual can select the time zone button 720 to establish a time zone for the group 165. The individual can select the GO button 725 to establish the given aspects of the group 165.

Figure 8:
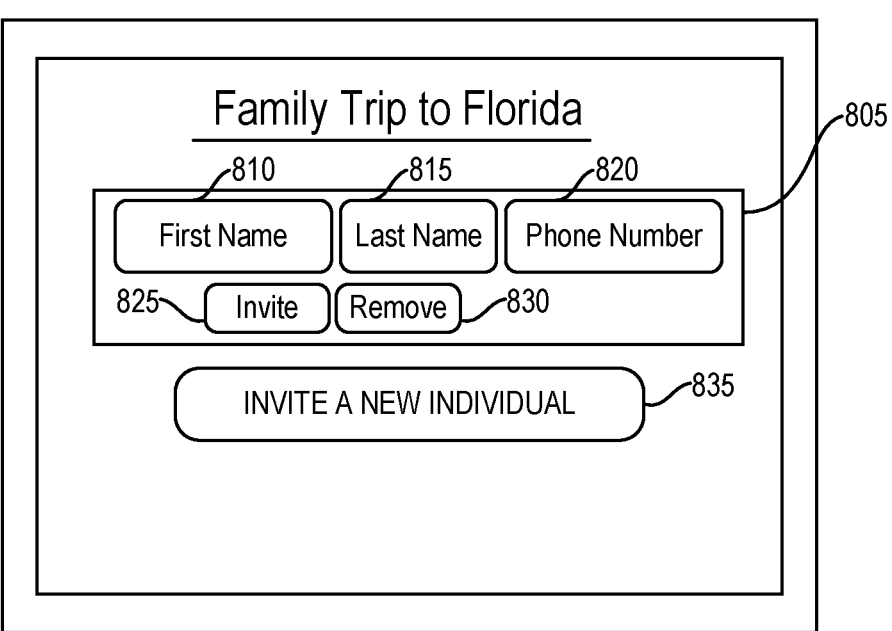
FIG. 8 is a user interface of a system for collaborative messaging, according to some embodiments.

FIG. 8 depicts a user interface 800. The user interface 800 can be generated by the group management system 105. The user interface 800 can be presented, via the user devices 109, to one or more individuals. The user interface 800 can be presented via the user devices 109 responsive to an individual selecting the GO button shown in FIG. 7. The user interface 800 can include at least one window 805 and at least one button 835. The window 805 can include one or more text boxes (e.g., text boxes 810, 815, and/or 820) and one or more buttons (e.g., buttons 825 and/or 830). The individual can interact with, interface with, and/or otherwise engage with the text boxes 810, 815, and/or 820 to provide information associated with one or more individuals for inclusion in the group 165. For example, the individual associated with the user devices 109 displaying the user interface 800 can enter a first name in text box 810, a last name in text box 815, and a phone number (e.g., a contact medium) into text box 820. The individual can select the invite button to have a prompt sent to the user device 109 associated with the individual entered in the window 805. The individual can select the button 835 to have an additional window 805 be created and/or presented.

FIG. 9 depicts a user interface 900. The user interface 900 can be generated by the group management system 105. The user interface 900 can be presented, via the user devices 109, to one or more individuals. The user interface 900 can be presented via the user devices 109 responsive to the prompt generator 130 generating one or more prompts (e.g., prompts 155) for the groups 165. The user interface 900 is shown to include prompts 905, 910, 915, 920, 925, 930, 935, and/or 940. The prompts can be included in a text box and the individual can interact with the text boxes to modify given prompts. FIG. 9 depicts an example of the individual having interacted with a window 945 corresponding to prompt 940. The individual can also provide a user defined prompt via window 950. The individual can provide and/or enter text associated with the user defined prompt.

Figure 10:
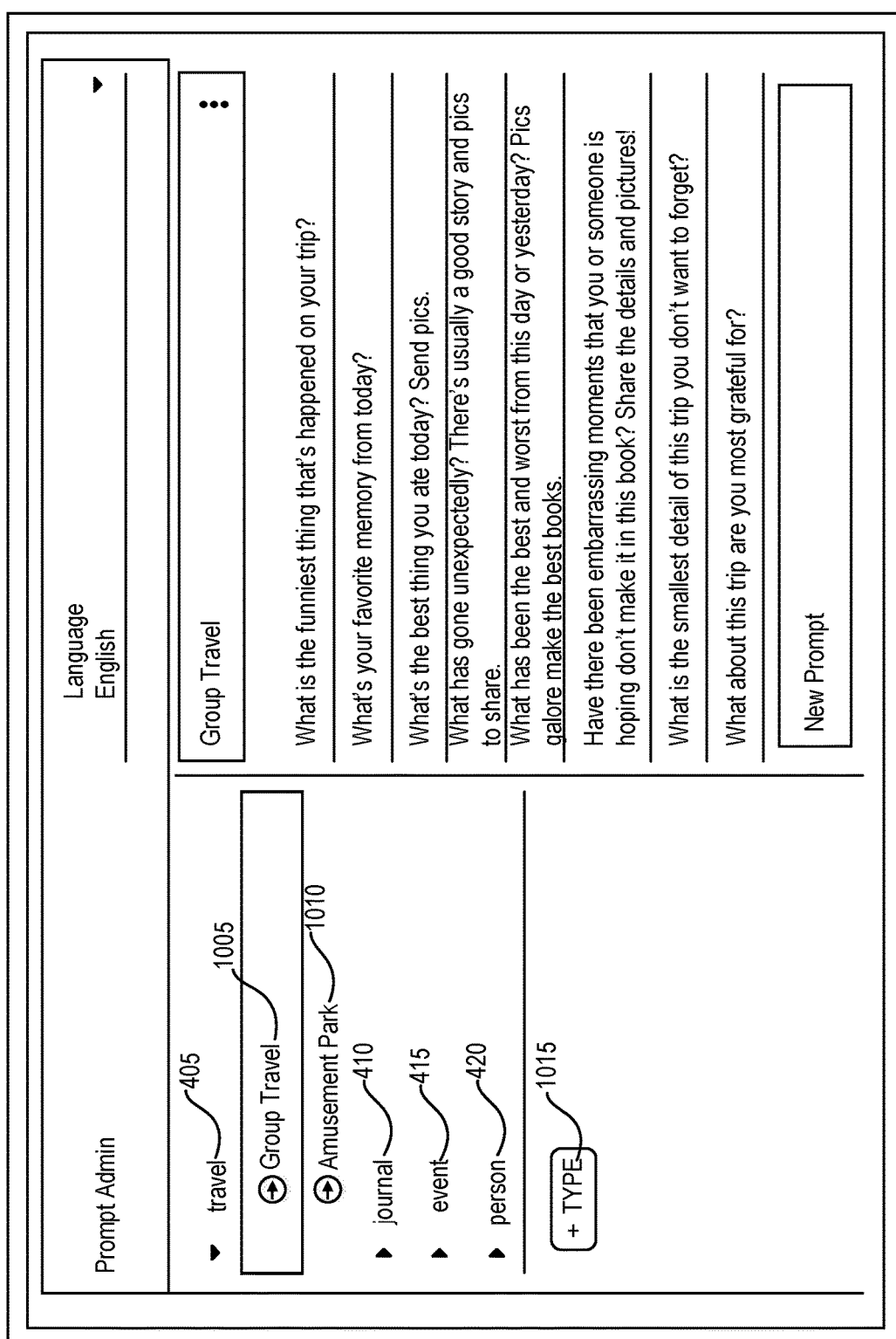
FIG. 10 is a user interface of a system for collaborative messaging, according to some embodiments.

FIG. 10 depicts a user interface 1000. The user interface 1000 can be generated by the group management system 105. The user interface 1000 can be presented, via the user devices 109, to one or more individuals. The user interface 1000 can include the travel parameter 405, the journal parameter 410, the special event parameter 415, and the special person parameter 420. The travel parameter 405 can include at least one category (e.g., categories 1005 and 1010). FIG. 10 depicts an example of the group travel category having been selected and an example of a group travel window including one or more prompts that were generate by the prompt generator 130 that pertain to the group travel category 1005.

Figure 11:
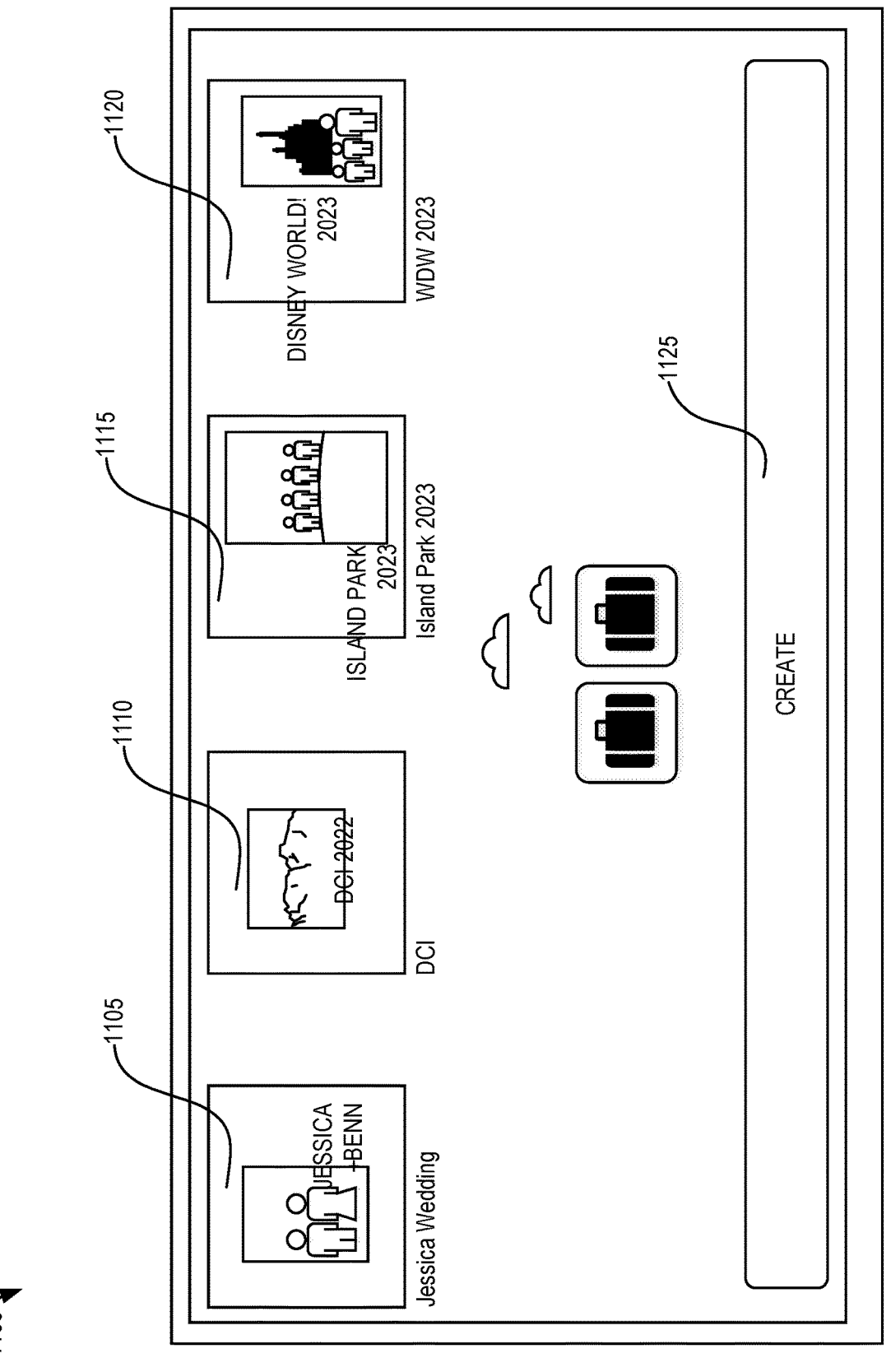
FIG. 11 is a user interface of a system for collaborative messaging, according to some embodiments.

FIG. 11 depicts a user interface 1100. The user interface 1100 can be generated by the group management system 105. The user interface 1100 can be presented, via the user devices 109, to one or more individuals. The user interface 1110 can include at least one icon (e.g., icons 1105, 1110, 1115, and/or 1120). The icons can illustrate and/or represent one or more groups 165. For example, the icon 1105 is shown represent a group 165 pertaining to Jessica wedding. The individual associated with the user device 109 displaying the user interface 1100 can select button 1125 to create a new group 165.

Figure 12:
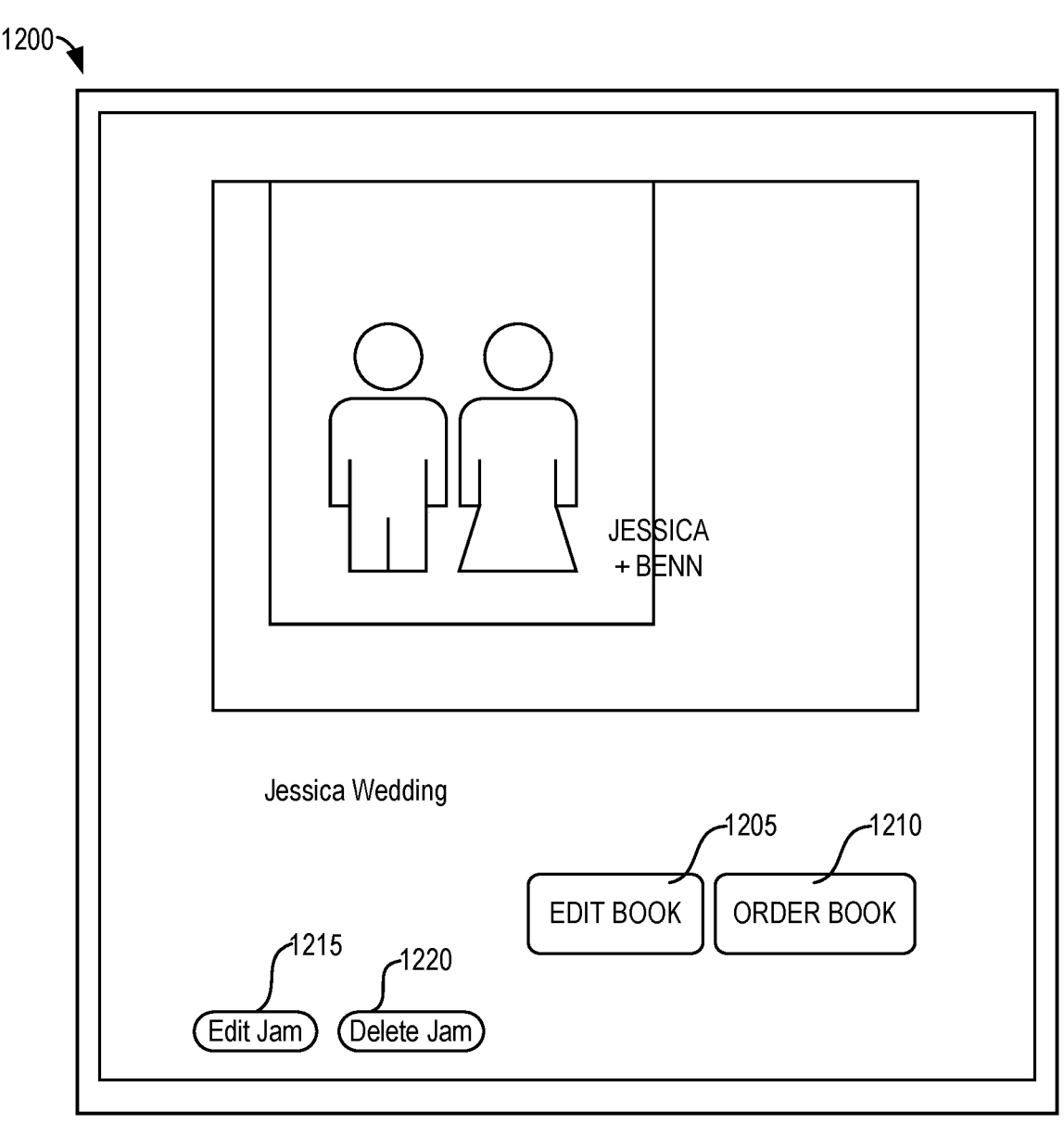
FIG. 12 is a user interface of a system for collaborative messaging, according to some embodiments.

FIG. 12 depicts a user interface 1200. The user interface 1200 can be generated by the group management system 105. The user interface 1200 can be presented, via the user devices 109, to one or more individuals. The user interface 1200 can be presented responsive to the individual interact with, interfacing with, and/or engaging with icon 1105 as shown in FIG. 11. The user interface 1200 can include at least one button (e.g., buttons 1205, 1210, 1215, and/or 1220). The individual can select the button 1205 to edit the responses 160 that have been received for the group 165. The individual can select the button 1205 to order a copy of the response 160. The individual can select the button 1215 to edit the group 165. The individual can select the button 1220 to delete the group.

Figure 13:
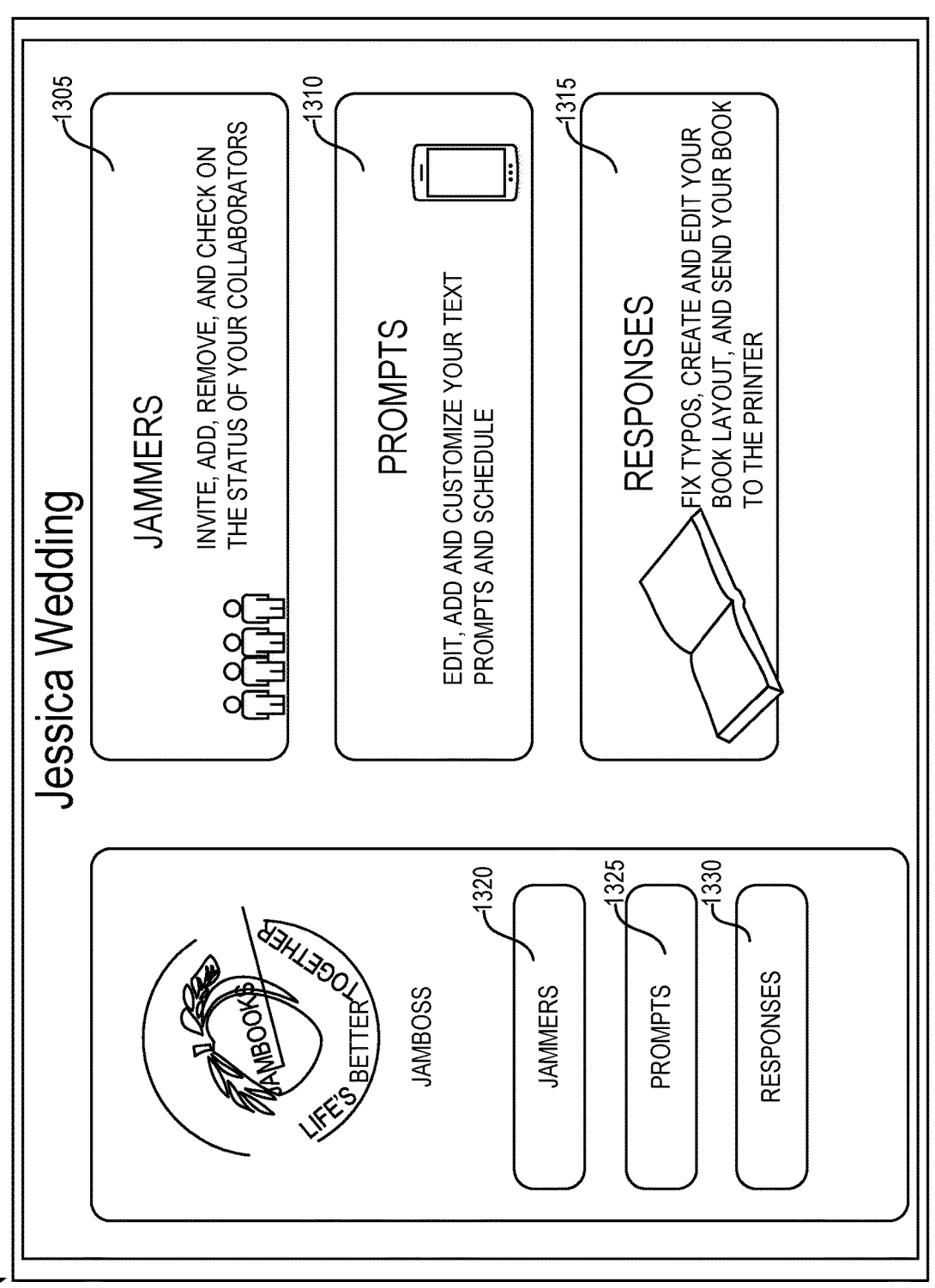
FIG. 13 is a user interface of a system for collaborative messaging, according to some embodiments.

FIG. 13 depicts a user interface 1300. The user interface 1300 can be generated by the group management system 105. The user interface 1300 can be presented, via the user devices 109, to one or more individuals. The user interface 1300 can be presented responsive to the individual interact with, interfacing with, and/or engaging with the button 1215 as shown in FIG. 12. The user interface 1300 can include one or more buttons (e.g., buttons 1305, 1310, 1315, 1320, 1325, and/or 1330. The individual associated with the user device 109 displaying the user interface 1300 can select the buttons to open up and/or view given aspects and/or information pertaining to the group 165. The individual can select button 1305 and/or 1320 to view the list 175 including the individuals of the group 165. The individual can select but 1310 and/or 1325 to view the prompts 155 that have been generated for the group 165. The individual can select the button 1315 and/or 1330 to view the response 160 that have been received pertaining to the prompts 155

Figure 14:
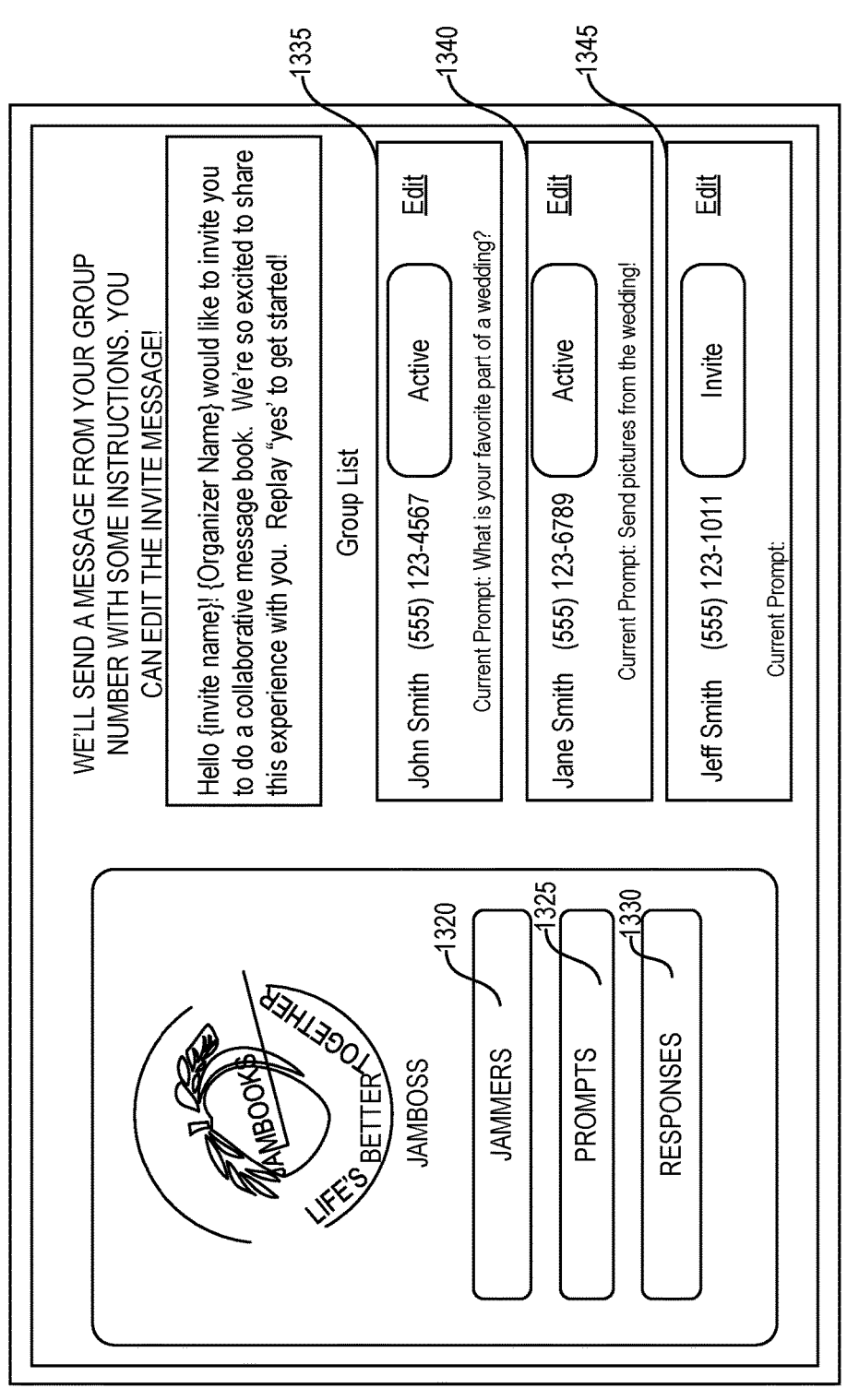
FIG. 14 is a user interface of a system for collaborative messaging, according to some embodiments.

FIG. 14 depicts a user interface 1400. The user interface 1400 can be generated by the group management system 105. The user interface 1400 can be presented, via the user devices 109, to one or more individuals. The user interface 1400 can be presented responsive to the individual interact with, interfacing with, and/or engaging with the buttons 1305 and/or 1320 as shown in FIG. 13. The user interface 1400 can include the buttons 1320, 1325 and/or 1330. The user interface 1500 can include the list 175. The user interface 1500 can include one or more windows (e.g., windows 1335, 1340, and/or 1345). The windows can correspond to one or more individuals of the group 165.

Figure 15:
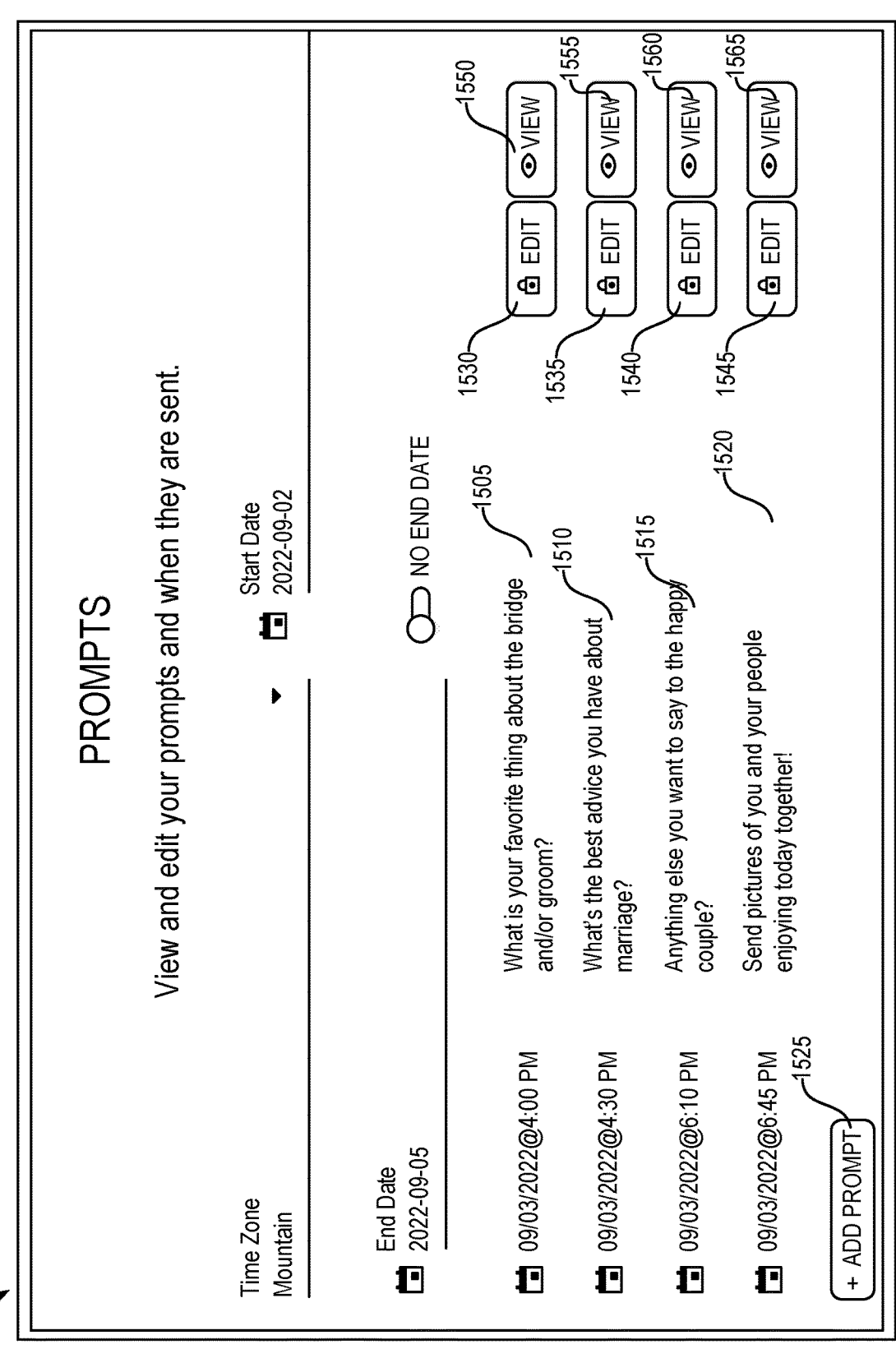
FIG. 15 is a user interface of a system for collaborative messaging, according to some embodiments.

FIG. 15 depicts a user interface 1500. The user interface 1500 can be generated by the group management system 105. The user interface 1500 can be presented, via the user devices 109, to one or more individuals. The user interface 1500 can be presented responsive to the individual interact with, interfacing with, and/or engaging with the buttons 1310 and/or 1325. The user interface 1500 can include at least one prompt (e.g., prompts 1505, 1510, 1515, and/or 1520). The user interface can include at least one button (e.g., buttons 1525, 1530, 1535, 1540, 1545, 1550, 1555, 1560, and/or 1565). The individual associated with the user devices 109 displaying the user interface 1500 can select the button 1525 to add a prompt. The individual can select at least one of the buttons 1530, 1535, 1540, and/or 1545 to edit at least one of the prompts shown in the user interface 1500. The individual can select at least one of the buttons 1550, 1555, 1560, and/or 1565 to view a preview of at least one of the prompts.

Figure 16:
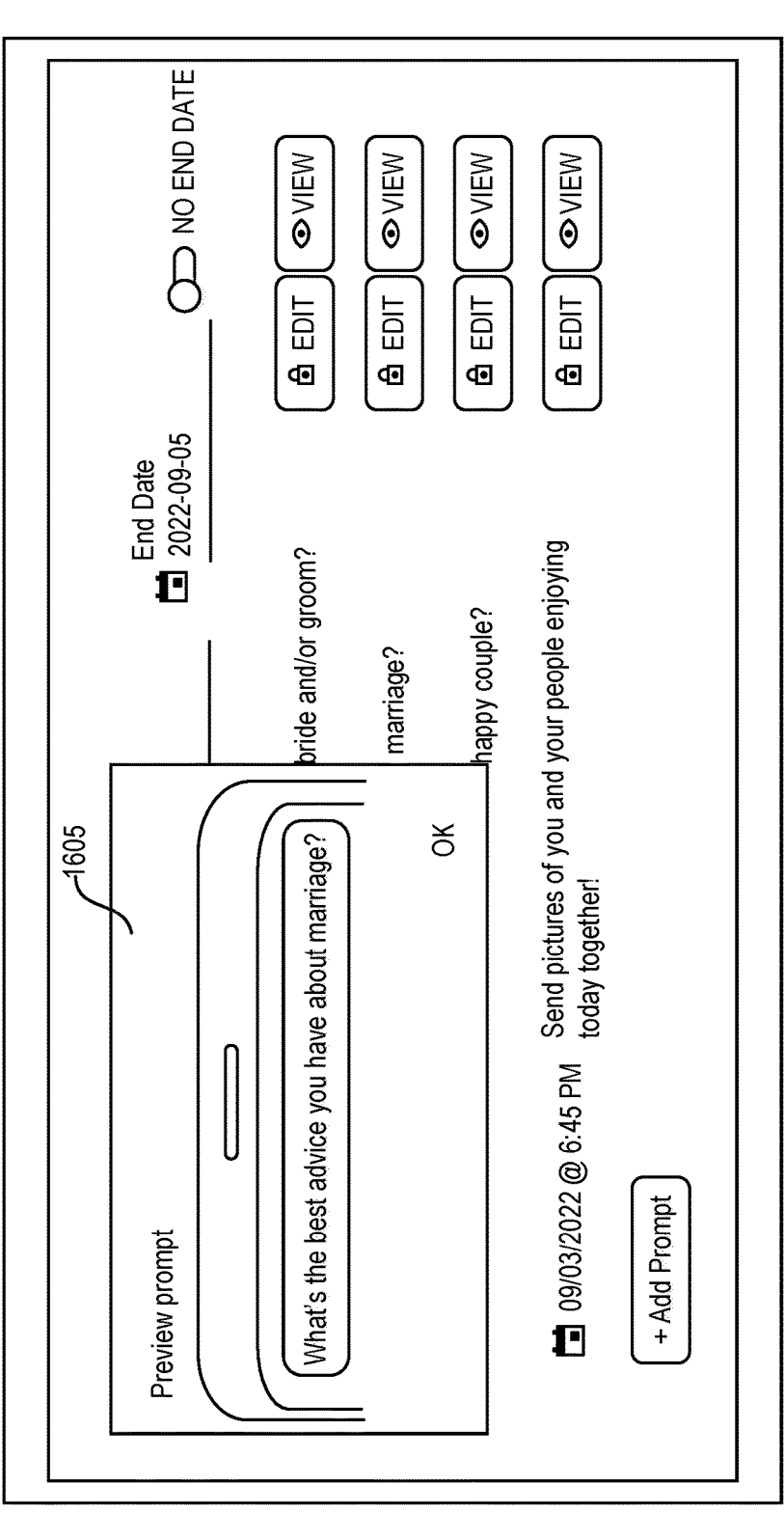
FIG. 16 is a user interface of a system for collaborative messaging, according to some embodiments.

FIG. 16 depicts a user interface 1600. The user interface 1600 can be generated by the group management system 105. The user interface 1600 can be presented, via the user devices 109, to one or more individuals. The user interface 1600 can be presented responsive to the individual interacting with, interfacing with, and/or engaging with at least one of the buttons 1550, 1555, 1560, and/or 1565. FIG. 16 shows the user interface 1600 as a pop-up window disposed on top of at least a portion of the user interface 1500. The user interface 1600 includes window 1605. The window 1605 can provide a preview of the prompt to illustrate how the prompt can look when provided to individuals of the group 165.

Figure 17:
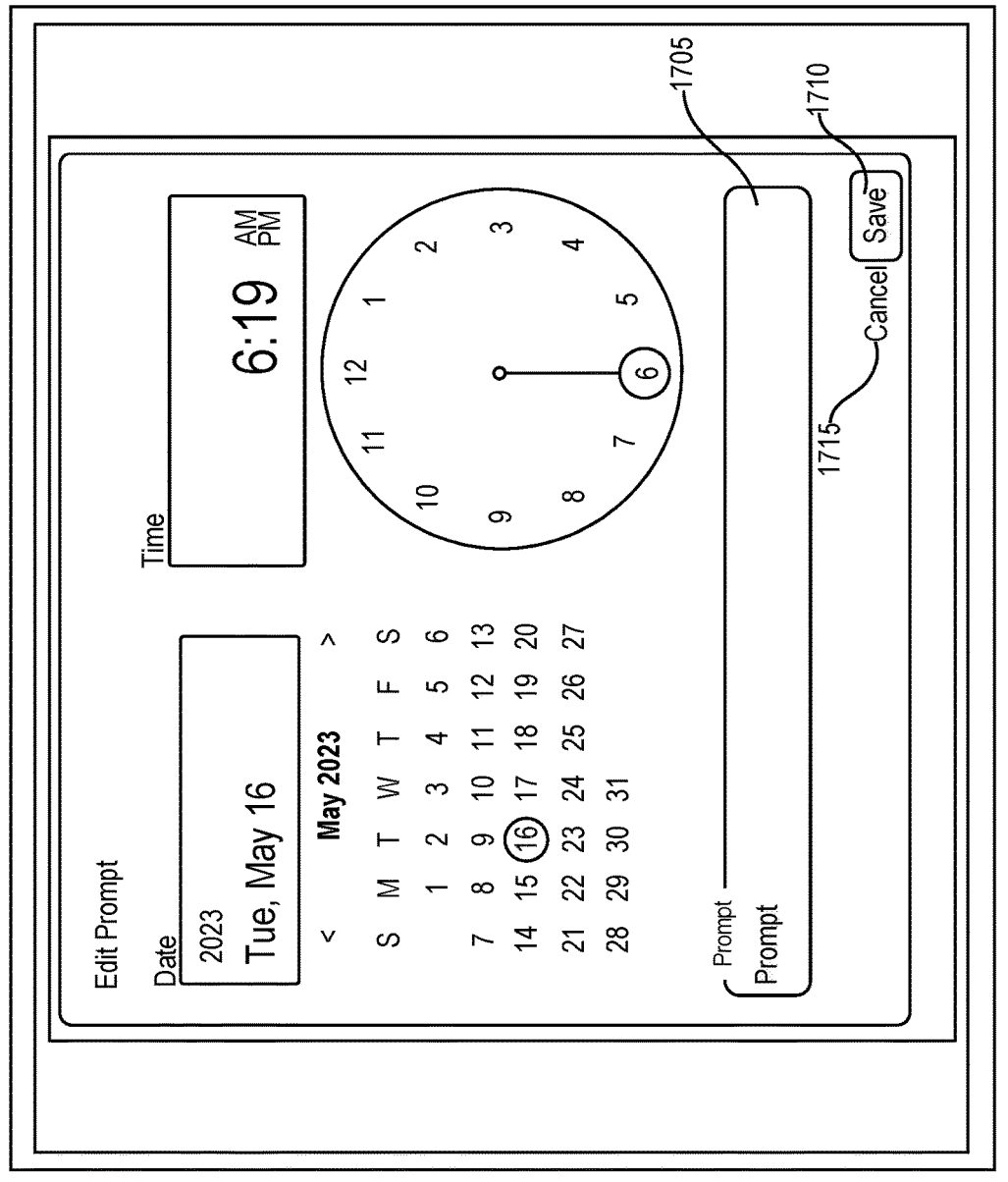
FIG. 17 is a user interface of a system for collaborative messaging, according to some embodiments.

FIG. 17 depicts a user interface 1700. The user interface 1700 can be generated by the group management system 105. The user interface 1700 can be presented, via the user devices 109, to one or more individuals. The user interface 1700 can be presented responsive to the individual interacting with, interfacing with, and/or engaging with the button 1525. The user interface 1700 can include a text box 1705, a cancel button 1715, and a save button 1710. The individual associated with the user device 109 displaying the user interface 1700 can interact with, interface with, and/or engage with the text box 1705 to enter and/or provide text for inclusion in a user defined prompt 155. The individual can select the cancel button to cancel the prompt. The individual can select the save button 1710 to establish the prompt for the group 165.

Figure 18:
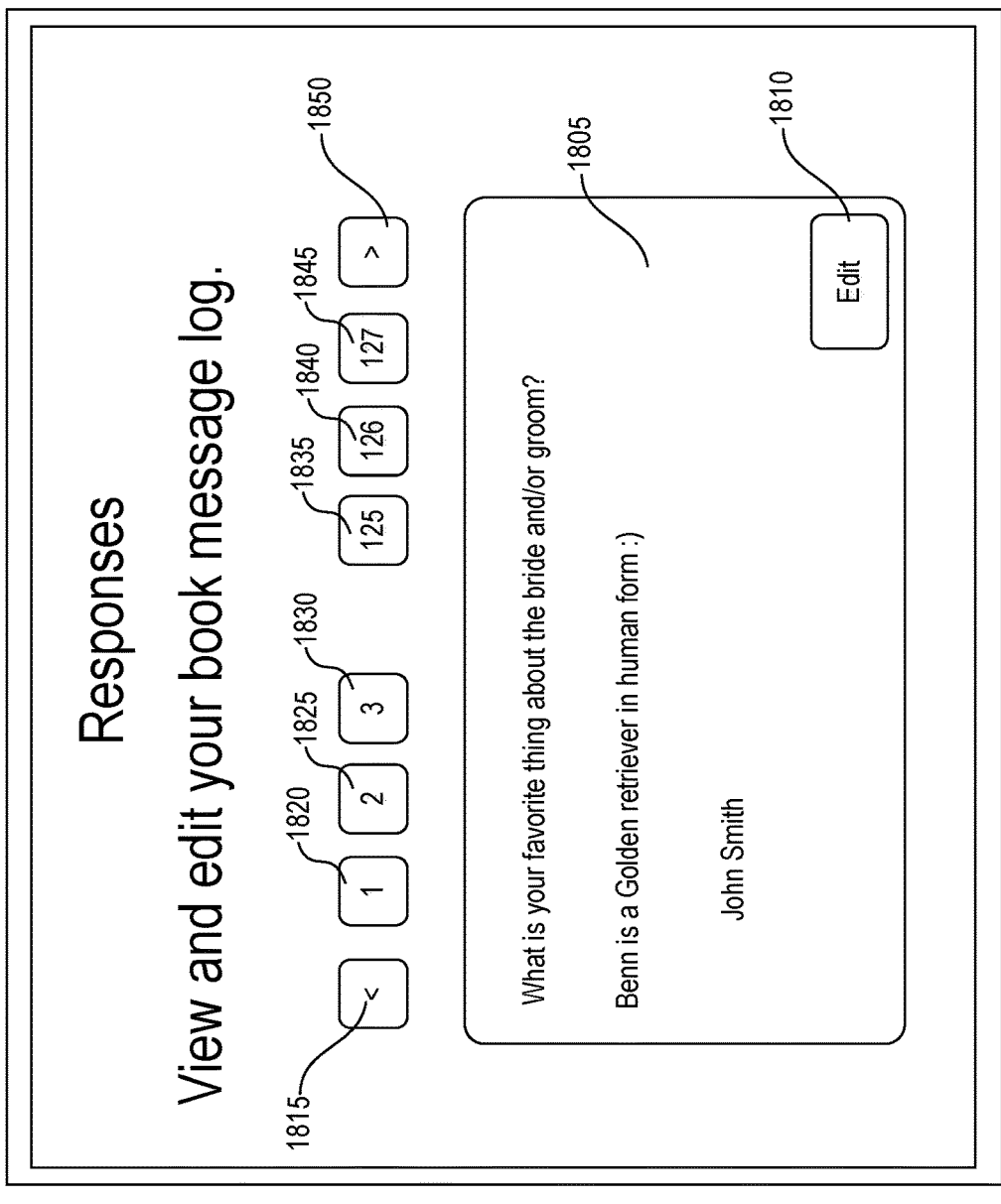
FIG. 18 is a user interface of a system for collaborative messaging, according to some embodiments.

FIG. 18 depicts a user interface 1800. The user interface 1800 can be generated by the group management system 105. The user interface 1800 can be presented, via the user devices 109, to one or more individuals. The user interface 1800 can be presented responsive to the individual interacting with, interfacing with, and/or engaging with the button 1315 and/or the button 1330. The user interface 1800 can include at least one button (e.g., buttons 1810, 1815, 1820, 1825, 1830, 1835, 1840, 1845, 1850, and/or 1850). The buttons 1820-1845 can correspond to one or more responses. For example, the buttons 1820-1845 can correspond to responses 160. The individual can select at least one of the buttons 1820-1845 to view the corresponding responses 160. FIG. 18 depicts an example of the button 1820 having been selecting and the corresponding response (e.g., response 1805). The individual can select the button 1810 to edit the response 1805.

Figure 19:
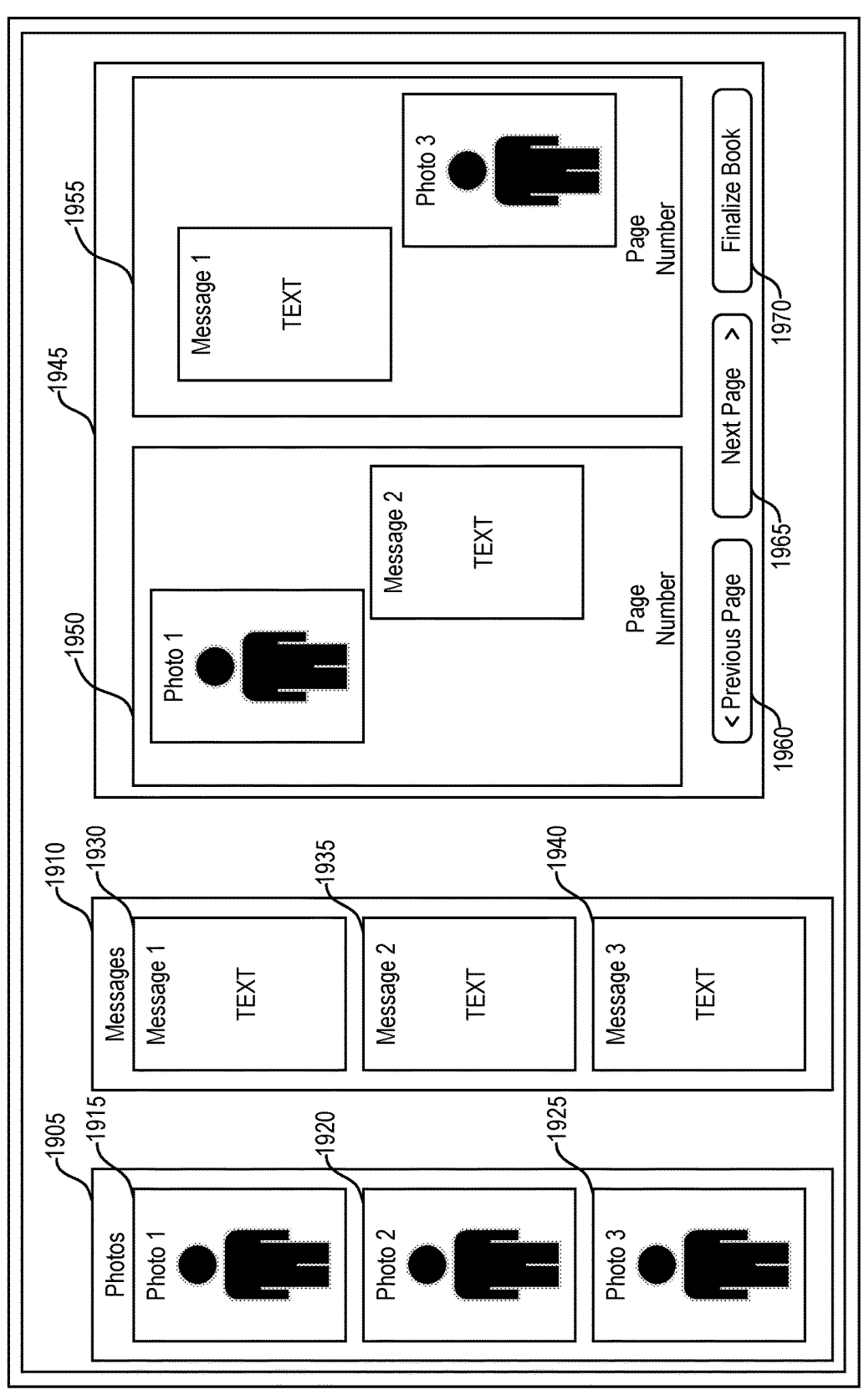
FIG. 19 is a user interface of a system for collaborative messaging, according to some embodiments.

FIG. 19 depicts a user interface 1900. The user interface 1900 can be generated by the group management system 105. The user interface 1900 can be presented, via the user devices 109, to one or more individuals. The user interface 1900 can be presented responsive to the individual interacting with, interfacing with, and/or engaging with the button 1205. The user interface 1900 can include at least one window (e.g., windows 1905, 1910, and/or 1945). The window 1905 can include at least one photo (e.g., photos 1915, 1920, and/or 1925). The photos included in the window 1905 can be received with and/or included in the responses 160. The window 1910 can include at least one message (e.g., messages 1930, 1935, and/or 1940). The messages included in the in window 1910 can be received with and/or include in the response 160. The individual associated with user device 109 can interact with, interface with, and/or otherwise engage with at least one of the photos and/or the messages to move a copy of the photos or the messages to one or more pages (e.g., pages 1950 and/or 1955) of the window 1945. The window 1945 can provide a digital illustration of the deliverable copy (e.g., a physical copy) of the responses 160. The individual can select button 1960 to move to a previous page. The individual can select button 1965 to move to the next page. The individual can select button 1970 to finalize the deliverable copy of the responses 160.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

What is claimed is:

1. A system comprising one or more memory devices storing instructions thereon, that, when executed by one or more processors, cause the one or more processors to:

receive, via at least one communication channel of a network, from a first user device associated with a first individual, a first electronic message including a request to collaborate as a group, the request including a user defined parameter and a list, the list including a second individual to be invited to collaborate with the group;

generate, responsive to receiving the first electronic message, a group record for the group by:

associating the first individual with the group record; and providing, via the at least one communication channel, to a second user device associated with the second individual, an electronic invitation to join the collaboration, wherein the invitation to join is provided in accordance with a first communication protocol;

update, responsive to receiving an electronic indication that the second individual accepted the invitation, the group record by associating the second individual with the group record;

generate, using the user defined parameter, a plurality of prompts to be used to electronically request information from the first individual and the second individual, wherein generating the plurality of prompts includes:

retrieving, from a database, a plurality of previous prompt records established by a third individual, the plurality of previous prompt records having a second user defined parameter, the second user defined parameter having one or more correlations with the user defined parameter; and selecting, from the plurality of previous prompt records using one or more rules, a subset of previous prompt records of the plurality of previous prompt records;

transmit, via the at least one communication channel, to the first user device, a second electronic message to provide the plurality of prompts;

transmit, via the at least one communication channel, to the second user device, a third electronic message to provide the plurality of prompts in accordance with the first communication protocol;

receive, via the at least one communication channel, from the second user device, a fourth electronic message that includes a response including information that pertains to at least one prompt of the plurality of prompts, wherein the fourth electronic message is provided in accordance with the first communication protocol; and store, responsive to receipt of the response, the response as a data structure in the database and in association with the group record and the user defined parameter.

2. The system of claim 1, wherein in the instructions further cause the one or more processors to:

receive, from the second user device, a plurality of responses including information that pertains to the plurality of prompts;

store, in the database, the plurality of responses as prompt records;

provide, to the first user device responsive to a predetermined amount of time, the plurality of responses; and receive, from the first user device, a selection of at least one response of the plurality of responses.

3. The system of claim 2, wherein the instructions further cause the one or more processors to:

provide, to at least one of the first user device or the second user device, a first message to propose a physical copy of the at least one response of the plurality of responses;

generate, responsive to receiving a response to the first message, the physical copy of the at least one response of the plurality of responses; and provide, responsive to generating the physical copy of the at least one response of the plurality of responses, a second message to indicate generation of the physical copy.

4. The system of claim 1, wherein the instructions further cause the one or more processors to:

provide, to the first user device responsive to receiving the response including the information that pertains to the at least one prompt of the plurality of prompts, a message including the response;

receive, from the first user device, an indication to generate a physical copy of the response; and generate, responsive to receiving the indication, the physical copy of the response.

5. The system of claim 1, wherein generating the plurality of prompts includes:

determining, using information associated with at least one of the first individual or the second individual, a group category;

identifying, using the group category, a plurality of predetermined prompts among the plurality of previous prompt records; and selecting, from the plurality of predetermined prompts, one or more prompts associated with the user defined parameter.

6. The system of claim 1, wherein the second individual is one of a plurality of second individuals, wherein the second user device is one of a plurality of second user devices associated with the plurality of second individuals, and wherein the instructions further cause the one or more processors to:

provide, to the plurality of second user devices, the plurality of prompts;

determine, responsive to a predetermined amount of time, that at least one given individual of the plurality of second individuals has yet to respond to the plurality of prompts; and provide, to a given second user device of the plurality of second user devices associated with the at least one given individual of the plurality of second individuals, an electronic reminder to respond to the plurality of prompts, wherein the electronic reminder is provided in accordance with the first communication protocol.

7. The system of claim 1, wherein the instructions further cause the one or more processors to:

associate the plurality of prompts with one or more second user defined parameters based on a plurality of relationships between the plurality of prompts and the one or more second user defined parameters;

receive, from a third individual, a request to generate prompts for a second group, the request including a third user defined parameter; and generate, responsive to determining an association between the third user defined parameter and the one or more second user defined parameters, a second plurality of prompts for the second group, wherein the second plurality of prompts includes the at least one prompt of the plurality of prompts.

8. The system of claim 1, wherein the instructions further cause the one or more processors to:

receive, from the first user device, a revision to a given prompt of the plurality of prompts;

update, responsive to receipt of the revision, the given prompt of the plurality of prompts to reflect the revision;

determine that the information included in the response received from the second user device pertains to a second given prompt of the plurality of prompts; and provide, to the second user device, the given prompt of the plurality of prompts.

9. The system of claim 1, wherein the response including the information that pertains to the plurality of prompts includes at least one of:

a video;

a picture;

a message;

an annotation; or a recording.

10. The system of claim 9, wherein the user defined parameter is at least one of:

an event type;

a geographic location;

a point of interest;

a person;

a memory; or an entity.

11. The system of claim 9, wherein the first communication protocol is at least one of:

multimedia messaging service (MMS); or short messaging service (SMS).

12. The system of claim 1, wherein at least one of the invitation to join the group or the plurality of prompts are provided, to the second user device, without the second individual having a user account.

13. The system of claim 12, wherein the response including the information that pertains to the at least one prompt of the plurality of prompts is received, from the second user device, without the second individual having the user account.

14. A computer-implemented method, comprising:

receiving, by one or more processors, via at least one communication channel of a network, from a first user device associated with a first individual, a first electronic message including a request to collaborate, the request including a user defined parameter and a list, the list including a second individual to be invited to collaborate;

generating, by the one or more processors responsive to receiving the first electronic message, a group record by:

associating the first individual with the group record; and providing, via the at least one communication channel, to a second user device associated with the second individual, an electronic invitation to join the collaboration, wherein the invitation to join the collaboration is provided in accordance with a first communication protocol;

updating, by the one or more processors responsive to receiving an indication that the second individual accepted the invitation, the group record by associating the second individual with the group record;

generating, by the one or more processors using the user defined parameter, a plurality of prompts to be used to request information from the first individual and the second individual, wherein generating the plurality of prompts includes:

retrieving, by the one or more processors, from a database, a plurality of previous prompt records established by a third individual, the plurality of previous prompt records having a second user defined parameter, the second user defined parameter having one or more correlations with the user defined parameter; and selecting, by the one or more processors, from the plurality of previous prompt records using one or more rules, a subset of previous prompt records of the plurality of previous prompt records;

transmitting, by the one or more processors, via the at least one communication channel, to the first user device, a second electronic message to provide the plurality of prompts;

transmitting, by the one or more processors, via the at least one communication channel, to the second user device, a third electronic message to provide the plurality of prompts in accordance with the first communication protocol;

receiving, by the one or more processors, via the at least one communication channel, from the second user device, a fourth electronic message that includes a response including information that pertains to at least one prompt of the plurality of prompts, wherein the fourth electronic message is provided in accordance with the first communication protocol; and storing, by the one or more processors, responsive to receiving the response, the response as a data structure in the database and in association with the group record and the user defined parameter.

15. The computer-implemented method of claim 14, further comprising:

receiving, by the one or more processors from the second user device, a plurality of responses including information that pertains to the plurality of prompts;

storing, by the one or more processors in the database, the plurality of responses as prompt records;

providing, by the one or more processors to the first user device responsive to a predetermined amount of time, the plurality of responses; and receiving, by the one or more processors from the first user device, a selection of at least one response of the plurality of responses.

16. The computer-implemented method of claim 15, further comprising:

providing, by the one or more processors to at least one of the first user device or the second user device, a first message to propose a physical copy of the at least one response of the plurality of responses;

generating, by the one or more processors responsive to receiving a response to the first message, the physical copy of the at least one response of the plurality of responses; and providing, by the one or more processors responsive to generating the physical copy of the at least one response of the plurality of responses, a second message to indicate generation of the physical copy.

17. One or more non-transitory computer-readable storage media having instructions stored thereon that, when executed by one or more processors, cause the one or more processors to:

receive, via at least one communication channel of a network, from a first user device associated with a first individual, a first electronic message including a request to create a collaboration, the request including a user defined parameter and a list, the list including a second individual to be invited to the collaboration;

generate, responsive to receiving the first electronic message, a group record for the collaboration by:

associating the first individual with the group record; and providing, via the at least one communication channel, to a second user device associated with the second individual, an electronic invitation to join the collaboration, wherein the invitation to join the collaboration is provided in accordance with a first communication protocol;

update, responsive to receiving an indication that the second individual accepted the invitation, the group record by associating the second individual with the group record;

generate, using the user defined parameter, a plurality of prompts to be used to request information from the first individual and the second individual, wherein generating the plurality of prompts includes:

retrieving, from a database, a plurality of previous prompt records established by a third individual, the plurality of previous prompt records having a second user defined parameter, the second user defined parameter having one or more correlations with the user defined parameter; and selecting, from the plurality of previous prompt records using one or more rules, a subset of previous prompt records of the plurality of previous prompt records;

transmit, via the at least one communication channel, to the first user device, a second electronic message to provide the plurality of prompts;

transmit, via the at least one communication channel, to the second user device, a third electronic message to provide the plurality of prompts in accordance with the first communication protocol;

receive, via the at least one communication channel, from the second user device, a fourth electronic message that includes a response including information that pertains to at least one prompt of the plurality of prompts, wherein the fourth electronic message is provided in accordance with the first communication protocol; and store, responsive to receipt of the response, the response as a data structure in the database and in association with the group record and the user defined parameter.

18. The one or more non-transitory computer-readable storage media of claim 17, wherein the instructions further cause the one or more processors to:

receive, from the first user device, a revision to a given prompt of the plurality of prompts;

update, responsive to receipt of the revision, the given prompt of the plurality of prompts to reflect the revision;

determine that the information included in the response received from the second user device pertains to a second given prompt of the plurality of prompts; and provide, to the second user device, the given prompt of the plurality of prompts.

19. The one or more non-transitory computer-readable storage media of claim 17, wherein:

the invitation to join the group and the plurality of prompts are provided, to the second user device, without the second individual having a user account; and

the response including the information that pertains to the at least one prompt of the plurality of prompts is received, from the second user device, without the second individual having the user account.

\* \* \* \* \*